US011865743B2

(12) United States Patent
Karlsson

(10) Patent No.: US 11,865,743 B2
(45) Date of Patent: Jan. 9, 2024

(54) METHOD AND TOOL FOR INJECTION MOULDING

(71) Applicant: FLEXIJECT AB, Alingsas (SE)

(72) Inventor: Lennart Karlsson, Alingsas (SE)

(73) Assignee: FLEXIJECT AB, Alingsas (SE)

( * ) Notice: Subject to any disclaimer, the term of this patent is extended or adjusted under 35 U.S.C. 154(b) by 0 days.

(21) Appl. No.: 18/157,847

(22) Filed: Jan. 23, 2023

(65) Prior Publication Data
US 2023/0166437 A1 Jun. 1, 2023

Related U.S. Application Data

(62) Division of application No. 15/733,643, filed as application No. PCT/SE2019/050257 on Mar. 22, 2019, now Pat. No. 11,613,057.

(30) Foreign Application Priority Data

Mar. 28, 2018 (SE) .................................. 1850352-4

(51) Int. Cl.
B29C 45/32 (2006.01)
B29C 45/27 (2006.01)
B29C 45/16 (2006.01)

(52) U.S. Cl.
CPC .......... B29C 45/2704 (2013.01); B29C 45/32 (2013.01); *B29C 2045/1681* (2013.01)

(58) Field of Classification Search
CPC ................ B29C 45/2704; B29C 45/32; B29C 45/26–27
See application file for complete search history.

(56) References Cited

U.S. PATENT DOCUMENTS 5,849,236 A 12/1998 Tatham
2002/0051830 A1 5/2002 Takikawa et al.
(Continued)

FOREIGN PATENT DOCUMENTS

JP S55-102522 U 7/1980
JP S63-10533 A 1/1988
JP 3-10821 A 1/1991
(Continued)

OTHER PUBLICATIONS

Office Action from corresponding Chinese Application No. 201980020761.4, dated Mar. 1, 2022, 19 pages.
(Continued)

*Primary Examiner* — Alison L Hindenlang
*Assistant Examiner* — Debjani Roy
(74) *Attorney, Agent, or Firm* — Tucker Ellis LLP

(57) ABSTRACT

Method for injection moulding one or more parts using an injection moulding machine and tool including at least one mould cavity, and a feed system comprising at least one gate and at least one runner that is located upstream of the at least one gate. The at least one runner includes at least one moveable wall and the method includes changing at least one cross-sectional dimension of the at least one runner by moving the at least one moveable wall in order achieve at least one of to vary a flow rate of material in the at least one runner, to apply a holding pressure to material in the at least one runner and consequently to the at least one mould cavity, or to compress residue in the at least one runner.

10 Claims, 17 Drawing Sheets

(56) References Cited

U.S. PATENT DOCUMENTS

2005/0046056 A1   3/2005  Dong et al.
2018/0272581 A1   9/2018  Uematsu

FOREIGN PATENT DOCUMENTS

| | | | |
|---|---|---|---|
| JP | H03-5116 | A | 1/1991 |
| JP | H06-210669 | A | 8/1994 |
| JP | 3003711 | U | 11/1994 |
| JP | H09-76296 | A | 3/1997 |
| JP | H0976296 | * | 3/1997 |
| JP | H10-175234 | A | 6/1998 |
| JP | 2000-167878 | A | 6/2000 |
| JP | 2001-269970 | A | 10/2001 |
| JP | 2003-276059 | A | 9/2003 |
| JP | 2004-188771 | A | 7/2004 |
| JP | 2007-175903 | A | 7/2007 |
| WO | 02/36324 | A1 | 5/2002 |
| WO | 2004/026556 | A1 | 4/2004 |

OTHER PUBLICATIONS

Notification of Reasons for Refusal of corresponding Japanese Application No. 2020-551878, dated Jan. 10, 2023, 3 pages.
Office Action of corresponding Korean Application No. 10-2020-7027283, dated Jul. 3, 2023, 10 pages.

* cited by examiner

PRIOR ART

METHOD AND TOOL FOR INJECTION MOULDING

TECHNICAL FIELD

The present invention concerns a method for injection moulding one or more parts in an injection moulding tool comprising at least one mould cavity, at least one gate, i.e. a side gate or any other type of gate, and at least one runner that is located upstream of said at least one gate.

BACKGROUND OF THE INVENTION

The following advanced injection moulding methods:
a) "Co-Injection" or "Sandwich Injection Moulding" of two different grades of plastic material, and
b) "Injection Moulding of Family Parts", have a considerable potential to provide decreased costs, less environmental loading, better utilization of resources and improved part quality compared to current injection moulding and tool technology.

In the co-injection/sandwich injection moulding method two different grades of plastic material form a sandwich structure in the wall cross sections of the injection-moulded part whereby a melt first injected into a cavity forms a comparatively thin surface layer, usually called a "skin", which covers the entire part and at the same time, or shortly after, a second injected melt forms a comparatively thick layer within the skin, called a "core layer", see FIGS. 1a, 1b and 1c.

There are two different moulding processes for co-injection:
  Simultaneous co-injection into the cavity of the melt of two plastic grades using a machine equipped with two complete injection units, which is the original method, and
  Sequential co-injection of the two plastic grades into the cavity using a machine with only one injection unit, which have the consequence that only so-called "cold runners" can be used for the feed system of plastic melt in the tool, which contrasts with simultaneous co-injection where both cold runners and so-called "hot runners" can be used. Mono Sandwich is the trade name of the sequential co-injection process shown in FIGS. 1a, 1b and 1c.

The significance of the word "cold" in cold runners is that the walls of the runners may be heated to a surface temperature that is lower than the melting point of semi-crystalline polymers or the softening/melting interval of amorphous polymers and consequently a thin layer of the material will solidify against the surface of the walls in a cold runner when the melt flows through the runner.

Co-injection methods are preferably used either:
  to combine different properties of the two plastic materials in the injection-moulded part, for instance a surface layer material that for instance has a desired colour, high UV resistance and/or gloss and a core layer material that is reinforced to give the part a high stiffness, or
  in order to save plastic material costs of the injection-moulded part by using low-priced materials for the core layer, such as recycled materials, low specified so-called industrial plastic grades or freshly produced plastic grades without any additives or with just small amounts of additives admixed after the polymerisation.

Injection moulding of family parts means that two or more parts with a different shape, size and/or weight are simultaneously moulded in respective mould cavities in the same tool comprising a plurality of cavities. The injection times for filling mould cavities of different sizes, volume and/or shape differ, which means that the holding pressure applied to the melt has to be activated in the cavities at different points of time.

However, the co-injection or sandwich injection moulding and injection moulding of family parts methods are not that well established on the market as other methods such as "Over-Moulding" and "Gas Assisted Injection Moulding" which methods were introduced at the same time as the aforementioned methods. One reason for this, and maybe the main reason, is that an appropriate tool technology not been thoroughly developed ever since these methods were taken into use.

There is a need to eliminate the limitations of current tool and process technology, which limitations have probably prevented co-injection and injection moulding of family parts from increasing their market shares.

The Mono Sandwich process is carried out in a machine with only one injection unit, as shown in FIGS. 1a-1c. A melt volume 3 that is intended to form the core layer of the final part is first metered into the injection unit 1. Then, a melt volume 2 that is intended to form a thin surface layer of the final part is plasticized in an extruder unit in the machine and metered through the orifice of the injection unit 1 to be positioned in front of the melt volume 3. As the screw piston 4 of the injection unit 1 begins its stroke, as shown in FIG. 1b, the surface material 2 will firstly be injected into the mould cavity 5, whereby a thin layer of the surface material will solidify against the comparatively cold shaping surfaces of the mould cavity. When the surface material 2 has been partly injected into the mould cavity 5 and the screw piston 4 continues making its stroke, the core material 3 will penetrate into the surface material 2 and press the surface material 2 against the shaping surfaces of the mould cavity 5, at the same time as the core material fills the mould cavity inside the surface material layer (as shown in FIG. 1c). In this manner, a two-layered injection moulded part with a thin surface layer and a continuous and substantially thicker core layer encapsulated therein, is obtained.

When injection moulding of multi-layer parts in accordance with any one of the known co-injection methods, it is usually desired that all cross sections of the part shall have a comparatively thin surface layer of one surface material and a thicker inner layer of a core material. When using co-injection methods the most optimal volume shares of surface material in relation to core material is about 25/75%. When using current tools in the injection moulding of multi-layer parts according to the co-injection method, these shares of about 25/75% are achieved only if the parts have a simple and/or symmetrical shape, such as the part/cavity shown in FIGS. 1a to 1c.

FIGS. 2 and 3 show examples of problems, which may arise when co-injection is used for moulding more complex parts using unsuitable gating into the mould cavity. The melt flow extends in different directions from a sprue gate 6 to the outer contour of the mould cavity. If there are different flow distances for the melt and different wall thicknesses of the part between the shaping surfaces of the cavity there will be a different flow resistance for the multi-layer melt in the various flow paths in the mould cavity, which in the co-injection process results in flow fronts for the two plastic melts that are non-uniform with respect to each other and also non-uniform with respect to the outer contour of the mould cavity. In the parts of the mould cavity where the flow paths for the melt are substantially longer than the flow paths in other parts of the mould cavity, reasonable optimal shares of surface and core materials, respectively, are not obtained in the cross section at the end of the flow paths furthest from the sprue gate 6 where there is only core material 7, as shown at the right-hand side of the part in FIG. 2, which shows the part from above and in a cross section along the line A-A. It can namely be seen in FIG. 2, that the core material melt 7 has penetrated through the surface material 8 at the flow front.

It is possible to partly obtain a multi-layer structure in the parts of the mould cavity which have the longest flow paths by overdosing the surface material melt, but, as can be seen in FIG. 3, a too large amount of the surface material 8 is obtained at the end of the shorter flow paths, which means that the core material will not reach the outer contour of the mould cavity at these positions. Furthermore the flow front of the multi-layer melt will be split when the flow front passes openings for connections, such as reinforcements 9 or attachment means 10 etc. This means that optimal volume shares of surface and core materials cannot usually be maintained, due to the breakthrough of core material and the excess of surface material which are obtained at undesired positions in the product as shown in FIG. 2, which shows a normal portion of core material in the reinforcements 9 and only core material in the snap-action attachment 10. In FIG. 3, the reinforcements have a too large portion of surface material, and the snap-action member 10 has a more normal share.

For injection moulded parts, such as panels, covers, housings, knobs, handles etc. there are generally specific demands on the properties of the visible surface layer of the parts, such as high finish, special features such as ultra-violet (UV) and heat resistance, high form accuracy, freedom from sinking, etc. This means that in case such parts are injection moulded with current methods using only one comparatively expensive material, the cost of the part will be fairly high. For portions of the parts which are not visible when the parts are in use there are usually no such demands on properties. Features such as connections, reinforcements and attachments, which have to exhibit good mechanical properties, such as toughness and rigidity, may have to be injection moulded using a material which is not suited for portions of the part that are visible in use. These types of parts are often multi-layer injection moulded by using the over-moulding method, often referred to as "double moulding". FIG. 4 shows the part illustrated in FIGS. 2 and 3 injection moulded using the over-moulding method. In this method, a material 7 is firstly injected into one mould cavity, which forms the rear part with the connections 9 and 10, whereupon the cavity that has formed the upper surface of the rear part is changed automatically in the over-moulding tool to a cavity which is somewhat larger, meaning that over-moulding with a surface layer material 8 can take place as shown in FIG. 4. However this method results in substantially high investments in machines and tools and a comparatively long cycle time.

By overdosing the surface material melt it is possible to obtain a multi-layer structure also in the parts of the mould cavity, which have the longest flow paths, but as can be seen in FIG. 3, a too large amount of the surface material 8 is obtained at the end of the shorter flow paths, which means that the core material will not reach the outer contour of the mould cavity at these positions.

EP 2,035,206 discloses a method and a tool for multi-layer injection moulding according to the co-injection method which provides a solution to the problems outlined above when using conventional tools for co-injection.

According to EP 2,035,206 a method for co-injection moulding a part incorporating an upper portion of the part and at least one connection integrated therewith is described. The cavity for the at least one connection is positioned in a movable tool core, see FIGS. 5*a* and *b*, which core can be controlled to close and to open the entrance of the cavity for the at least one connection. The upper portion of the part is filled through an appropriate gate, for example a side gate with a plurality of runners upstream of the side gate or through any other suitable type of gate. When the entrance to the at least one connection is in a closed position as shown in FIG. 5*a*, the cavity for the upper portion of the part will be properly co-injected as the cavity of the at least one connection will not split the flow front of the co-injection process for the upper portion of the part. When the cavity of the upper portion of the part is completely filled and all metered surface material is used for moulding the surface layer of the upper portion of the part, the tool core for the at least one connection is activated to open the entrance whereby the melt of the core material will break through the surface material layer at the entrance and fill the cavity of the at least one connection, i.e. the at least one connection will consist of only core material. So, the method according to EP 2,035,206 will result in a multi-layer moulded part that is similar to the part shown in FIG. 4, which is injection moulded by the over-moulding method.

SUMMARY OF THE INVENTION

The object of the invention is to provide an improved method for injection moulding one or more parts in an injection moulding tool that comprises one or more mould cavities and which tool has a feed system for the melt, which comprises at least one runner that is located upstream of at the least one gate. The gate can be a side gate or any other type of gate which lets the melt into the at least one mould cavity. The feed system thus accommodates the melt coming from the injection unit in the injection moulding machine and guides the melt in one or more runners through the injection moulding tool to one or more gates into one or more mould cavities.

The at least one runner according to the invention comprises at least one movable wall and the method comprises the step of changing at least one cross-sectional dimension of the at least one runner by moving the moveable wall to allow at least one cross-sectional dimension of the at least one runner, such as height and/or width and/or diameter and/or any other dimension in a cross section with any other shape, to be changed, either manually or automatically before the injection moulding operation starts, or during an ongoing moulding cycle, to thereby adjust the melt flow rate in the at least one runner and/or to apply a holding pressure to the material in the at least one runner and consequently to the at least one mould cavity, i.e. to allow a mould cavity-specific holding pressure to be applied to each mould cavity, and/or to compress residue in the at least one runner. The movable wall is arranged to be mechanically, hydraulically or electrically controlled.

The improved method according to the invention is primarily intended to be used to increase versatility and cost-efficiency and to decrease environmental loading and utilization of resources concerning co-injection of parts with a sandwich structure, i.e. a surface and a core layer of two plastic materials, by using a single-cavity or a multi-cavity tool, and simultaneous injection moulding of family parts in a multi-cavity tool where mould cavities have different size, shape and/or volume.

A method according to the invention can also be applied to conventional injection moulding in order to reduce or eliminate various process and tool imperfections.

The present invention also concerns an injection moulding tool for performing a method according to any of the embodiments of the invention. The tool comprises at least one mould cavity and a feed system comprising at least one gate and at least one runner that is arranged to be located upstream of said at least one gate. The at least one runner comprises at least one movable wall that is arranged to enable at least one cross-sectional dimension of the at least one runner to be changed in order achieve at least one of the following:
a) to vary a flow rate of material in said at least one runner,
b) to apply a holding pressure to material in said at least one runner and consequently to said at least one mould cavity,
c) to compress residue in said at least one runner, whereby said tool comprises means to change said at least one cross-sectional dimension of said at least one runner.

According to an embodiment of the invention the feed system may comprise a plurality of runners located upstream of the at least one gate, whereby the at least one cross-sectional dimension of the at least one runner is arranged to be individually variable.

According to an embodiment of the invention the tool comprises a plurality of adjacently arranged gate inserts that are adapted to change the at least one cross-sectional dimension of the plurality of runners. Each gate insert may be arranged to change the at least one cross-sectional dimension of one runner, whereby the flow front of material entering a mould cavity via the plurality of runners may be accurately controlled.

According to an embodiment of the invention the tool comprises heating means to heat the at least one runner to a temperature less than a melting point or melting interval of the material in the at least one runner.

According to an embodiment of the invention a part of the means to change the at least one cross-sectional dimension of the at least one runner constitutes the moveable wall.

According to an embodiment of the invention the movable wall is arranged to be mechanically, hydraulically or electrically controlled by the means to change the at least one cross-sectional dimension of the at least one runner.

According to an embodiment of the invention the tool at least part of the means to change said at least one cross-sectional dimension of the at least one runner constitutes an exchangeable cassette that is arranged to be removably attached to the tool. A "cassette" is a protective case or holder comprising wear-resistant material, such as steel, which will protect its contents from being damaged when the means to change said at least one cross-sectional dimension of the at least one runner is being operated, under high pressure for example.

The object is achieved by a method and tool having the features recited in the claims, which make it possible to
vary the melt flow rate, $cm^3s^{-1}$, in at least one runner, and thereby in at least one mould cavity that is connected to said runner,
apply a holding pressure to the melt via at least one runner, and thereby to at least one mould cavity that is connected to said runner,
compress the residue in the feed system to a minimum volume in at least one of the runners in said feed system.

It should be noted that the expression "changing at least one dimension in the cross section of the runner" is intended to mean that at least one dimension in at least one part of the at least one runner may be changed. For example, the height in only one portion of a runner may be changed and not necessarily the height along the entire length of that runner.

The technical term "side gate" means a slot connecting at least one runner to one mould cavity, which slot is not too narrow and has a length that is appropriate for the spread of melt in the mould cavity connected to said gate. A side gate may be located to let in the melt at a lateral edge or close to such an edge of either a single-curved or a double-curved wall or an edge of a straight line of a flat wall of the part to be moulded. A gate should be dimensioned to allow for a sufficient flow of melt to fill the mould cavity without causing a too high shear that could degrade the material.

The melt may be any injection-mouldable material, such as any plastic, glass, elastomer, thermoplastic or thermosetting polymers or edible matter, such as confectionary, or a mixture containing at least one such material.

According to an embodiment of the invention, the feed system comprises a plurality of runners located upstream of the at least one hate and at least one cross-sectional dimension of the at least one runner is individually variable so that the melt flow rate in each of a plurality of runners can be individually controlled by individually adjusting at least one cross-sectional dimension in at least one of said runners. The required adjustment of at least one movable wall in order to achieve a desired individual flow rate from the outlet of said at least one runner is preferably carried out by hand-operated adjustment of the means for moving the at least one movable wall in the at least one runner. Consequently, the flow front profile and spread of melt in the mould cavity can be controlled to be even and continuous and the entire flow front can be controlled to simultaneously or almost simultaneously reach the contour that is farthest away from the side gate of the mould cavity.

A method according to the present invention can therefore be used to mould various types of parts that may have a fairly complex design, and especially when used for co-injection moulded parts the share of core layer material is increased and more uniformly spread compared to what is possible with conventional prior art methods of co-injection moulding using tools having a conventional feed system. According to an embodiment of the invention it is possible to reach a share of the core material which is substantially higher compared to the use of conventional tools with a conventional feed system. A share of at least about 50% of the total volume of a part having a fairly complex shape is possible to reach without core material melt breaking through the surface material layer and/or without too much surface material gathering in certain regions of the part. In case the parts have a simple and symmetric form even higher share than 50% will be reached.

The at least one dimension of a runner may be adjusted to make it possible to vary the melt flow rate either
manually before start of the moulding operations by means of a screw device, in a stepless manner by an amount that is fixed during the entire moulding operations, or
automatically, for example during an ongoing injection moulding cycle, in a stepless or gradual manner by means of mechanics or hydraulics or an electric circuit including a drive unit and a control system, which drive system might be hydraulic (gradually variable) or electric with servo motors (steplessly variable).

The method according to the invention can be used for balancing/fine tuning melt flow between cavities in multi-cavity tools or adjusting melt flow when needed in other injection moulding cases such as moulding of family parts. Using an electric servomotor as a drive unit provides a versatile and rapid variation of motion and force of the moving core in said runners whereby controlling of both melt flow and holding pressure operations can be performed during an ongoing moulding cycle.

According to an embodiment of the invention, a holding pressure can be applied to the melt in one or more of the plurality of runners whereby the pressure is momentarily transferred into the, or each respective mould cavity via the gate that connects the mould cavity with said runners. A holding pressure is always, in all injection moulding methods, applied in the melt to ensure that the melt in the mould cavity stays densely packed while it solidifies. Said holding pressure operation according to the present invention is individually controlled for each of one or more cavities, which can be expressed "mould cavity-specific", and the holding pressure operation is initiated at the same point of time, or substantially at the same point of time, as filling melt into each of the one or more mould cavities has been completed, also called volumetric filling. The injection moulding machine's holding pressure function is not thereby utilized. Instead, the injection moulding cycle in each mould cavity comprises:

i) using the injection moulding machine's injection function, which is improved by using the method and tool of the present invention since this allows the flow front to be controlled individually in each runner, and ii) applying a mould-cavity-specific holding pressure rather than the injection moulding machine's holding pressure function, whereby the injection moulding machine is reset as regards pressure, speed and starting point once each mould cavity has been filled.

When injection moulding family parts, the tool comprises mould cavities with unequal size, volume and/or shape that have to be filled using different injection times, which means that the holding pressure operation has to be initiated at different points of time in the various mould cavities.

Applying a holding pressure to the melt in one or more of the plurality of runners may be achieved by mechanical means with a drive unit that is coupled to a moving package/row of gate inserts and/or coupled to moving cores in a plurality of runners in the feed system upstream of the plurality of runners or upstream of any other chosen type of gate into the mould cavity. The mechanics and drive systems that are used for varying melt flow in said runners can as well be used for applying a holding pressure to the material in the runners and consequently to the respective mould cavities. The mechanics and drive system have to be adjusted so that enough volume of melt can be accumulated in the runners, constituting a so-called melt cushion, by moving backwards the package/row of gate inserts and/or the cores in one or more runners upstream of said gate inserts, which melt cushion ensures that the drive system pressurizes the melt during the whole holding pressure time.

A device for shutting off the melt flow upstream of runners wherein a holding pressure is intended to be applied, has to be arranged to prevent a portion of the melt in the melt cushion from flowing backwards in said runners thereby avoiding that a desired holding pressure would not be reached. It should be noted that the force needed for applying a holding pressure in some cases has to be higher than the force needed for changing the melt flow rate in the runners. The speed needed to move inserts and/or cores when changing the flow respectively applying a holding pressure are usually different as changing the flow usually is a more rapid movement. Thus, when combining the operations of changing melt flow and applying a holding pressure in the same runner during the same moulding cycle the dimensioning and specifications of the mechanics and the drive system have to be adapted to the force and speed needed for both operations.

This method according to the invention is especially intended to be used for single-material injection moulding family parts in a "multi-cavity mould", i.e. a tool comprising a plurality of mould cavities, where two or more cavities are different regarding shape, size and/or volume and whereby the cavities are only partly simultaneously filled as cavities with a large volume need a longer time to be filled than cavities with a smaller volume.

Accordingly the feed system for injection moulding family parts should comprise means for:
  a mould cavity-specific holding pressure function, operating individually in the melt in each cavity, and
  a shut-off device upstream in the runner(s) of said holding pressure function to prevent backflow of the melt when the holding pressure operation is activated.

Hereby the moulding process for the part in each separate mould cavity will turn out practically as if the part has been separately moulded with conventional methods, as whereby each part's weight and quality, such as surface finish, shape accuracy, mechanical properties etc. will remain unchanged.

The present invention is not limited to be used for co-injection moulding and/or injection moulding of family parts, but may also for instance be applied to single-material injection moulding, with one or more equal mould cavities, and to multi-material over-moulding.

The tool and method according to the invention can preferably be used in certain cases of conventional methods of injection moulding, for example in cases where the time for plasticizing and metering is so long that the time for performing the total moulding cycle has to be lengthened. By using the tool and method according to the invention, plasticizing and metering can start as soon as the mould cavity-specific holding pressure operations have been initiated, thus making it possible to shorten the cycle time.

According to an embodiment of the invention, compressing the material residue in the feed system can substantially reduce the amount of to be recycled either by grinding and plasticizing the residue directly in the injection unit of the machine or by separate recycling. Residue in one or more runners upstream of the plurality of side gate runners can be compressed either in case the compressing operation is combined with a holding pressure operation, or by a separate compressing operation in case a holding pressure operation is not used in said one or more runners. In the first case, i.e. combining with a holding pressure operation, a minimum of residue after compressing the residue in said one or more runners is reached by adjusting the melt cushion to contain a volume of melt that is exactly, or slightly larger than the volume that is needed for the holding pressure operation whereby a pressure should be applied to the melt during the whole duration of the holding pressure operation. The moving and pressurizing cores in said one or more runners will then compress the mixture of solidified and molten material residue to a minimum volume. In case the cores in said one or more runners are used merely for varying the melt flow rate, a compressing operation can be performed when the injection operation has ceased just by switching over the control system to a speed, pressure and/or time that is/are appropriate for the compression operation in said one or more runners. It should be noted that the degree of reduction of the residue in the feed system by compressing is dependant of factors such as stiffness, melt viscosity, reinforcement etc. of the mixture of molten and solidified material and the temperature of the walls in the runners.

A method for compressing the residue in the plurality of runners is also offered according to the invention by combining the embodiment of two packages/rows of gate inserts assembled opposite each other on both sides of the parting line of the tool and each of them coupled to a drive unit, whereby the compressing and holding pressure operations are performed simultaneously directly after volumetric filling of the cavity. The gate inserts in the package/row of inserts have to be adjusted so that the compressed residue will become as thin as possible without colliding with inserts on the opposite side of the parting line.

According to an embodiment of the invention the method comprises the means of heating the at least one runner to a temperature less than a melting point or melting interval of the material in the at least one runner. This can be achieved by heating a tool insert where the runner is positioned, to a temperature that is substantially higher than mould temperatures recommended by plastic material producers. The plastic layer, often called the "skin", of the melt that solidifies against the surface of the at least one runner will become extraordinarily thin. The higher the temperature on the heated surface, the thinner the thickness of the skin will become. Heating the tool inserts is performed by using a separate heating unit and the inserts must be thermally insulated to prevent heat being conducted or radiated to other parts of the tool, such as mould plates, mould cavity inserts etc. The designation of such a runner is still "cold runner" as its wall surface temperature is lower than the melting point or melting interval of the material meaning that a skin will solidify against the surfaces in the runner.

The embodiment of heated runners is primarily provided to ensure that the melt cushions in the runners will contain the highest possible share of molten material so as to achieve an efficient holding pressure operation. Flow resistance and shear in the melt will become lower as well which means that a lower injection pressure is needed for filling the melt through runners and into the mould cavity, which could be favourable when flow paths are long and/or flow resistance in the mould cavity is high.

All thermoplastic injection moulding grades, amorphous as well as semi-crystalline, and also thermoelastic grades, can be used with the embodiments according to the present invention. High viscosity amorphous thermoplastic grades such as PC (polycarbonate), PSU (polysulfone) and PES (polyether sulfone) will flow more easily in runners that are heated to a higher temperature, whereas an increase of injection speed and/or pressure will have less influence. The flowability of thermoelastomers, such as SEBS, is improved by a high shear in the melt. Such polymer-specific processing properties for certain plastic materials indicate that there is a need for runners to be separately heated and for the cross-sectional area of the runners to be adjusted when trying to find a process that provides a robust melt flow in the runners.

Generally, plastic materials with special processing properties/requirements such as high viscosity, high reinforcement, heat sensitive melt, highly shear-dependent flowability etc. could be better performed in injection moulding by utilizing one or more embodiments of the invention compared to the use of current technology for melt feed systems in the tool. Embodiments for runners upstream of the side gate are mainly characterised by a) being so called "cold runners", whereby, in contrast to so called "hot runners", the flexibility and reliability to adapt the feed system to various processing requirements of the plastic material to be used, as exemplified above, will improve, b) having a flow resistance that can be decreased or increased
either by infinitely adjusting (increasing or decreasing) their cross-sectional area,
or by separate heating or cooling of the tool inserts in which the runners are positioned, i.e. these tool inserts are thermally insulated from the other parts of the tool. When increasing the cross-sectional area and/ or the temperature of the walls in the cold runners the "open" cross-sectional area within the solified skin thus will increase and thereby the flow resistance in the runners will decrease.

Costs, environmental loading and utilization of resources in current injection moulding operations can be decreased by implementing a tool and method according to the present invention. The benefits for different injection moulding applications are:

a) co-injection moulding:
a 10-20% saving of the total plastic material cost for the parts by using low cost plastic materials, such as recycled grades, in the core layer, compared to conventional single-material injection moulding with only the usually more expensive surface layer materials,
decreased environmental loading by using recycled plastic materials,
shorter cycle time, meaning increased production capacity, when using the Mono Sandwich method in cases where the time for plasticizing/metering of core material moving the extruder forth to and back from the injection unit and plasticizing/metering of the surface material, is so long compared to the specific cycle time needed for the moulding operation in the cavity that the total cycle time has to be lengthened,
decreased tool costs and a shorter cycle time compared to the over-moulding method, b) injection moulding of family parts:
about 30% savings of total purchase price for a family tool compared to the purchase of separate tools for each of the family parts,
decreased production costs as acquisition and maintenance costs for the machine and peripheral equipment and costs for occupied factory area and operators will be lower,
decreased utilization of resources, such as steel material and various components for the tools, c) other conventional injection moulding cases:
shorter cycle time, meaning increased production capacity, when the time for plasticizing/metering of plastic material is so long that the total cycle time has to be lengthened,
improved reliability of filling balance in a multi-cavity tool where the cavities have equal shape, size and volume, meaning lower risk for not completely filled parts.

Any one or more of the features that are described with reference to the method according to the invention also apply to the tool according to the invention, and vice versa.

According to an embodiment of the invention the tool constitutes an exchangeable cassette, comprising one or more features of the tool, which is arranged to be removably attached to the injection moulding tool, using any suitable fastening means. Any part(s) of the tool, such as any or all parts of the melt flow varying and pressure-applying means may be housed in such a removable cassette.

BRIEF DESCRIPTION OF DRAWINGS

The present invention will hereinafter be further explained by means of non-limiting examples with reference to the appended schematic figures where.

It should be noted that the drawings have not necessarily been drawn to scale and that the dimensions of certain features may have been exaggerated for the sake of clarity.

DETAILED DESCRIPTION OF EMBODIMENTS

Figure 1C:
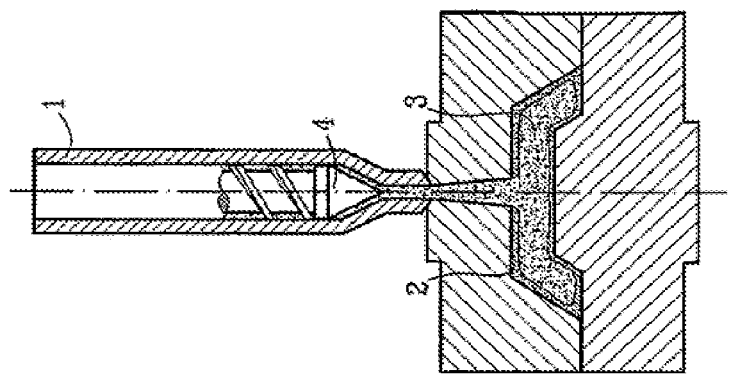
FIGS. 1a-c show the Mono Sandwich method according to the prior art.
Figure 1B:
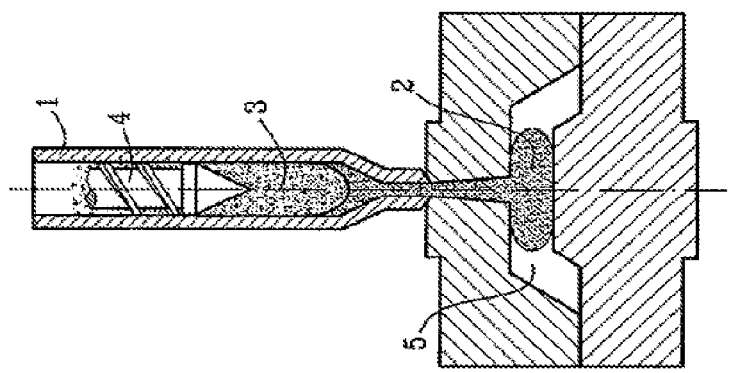
Figure 1A:
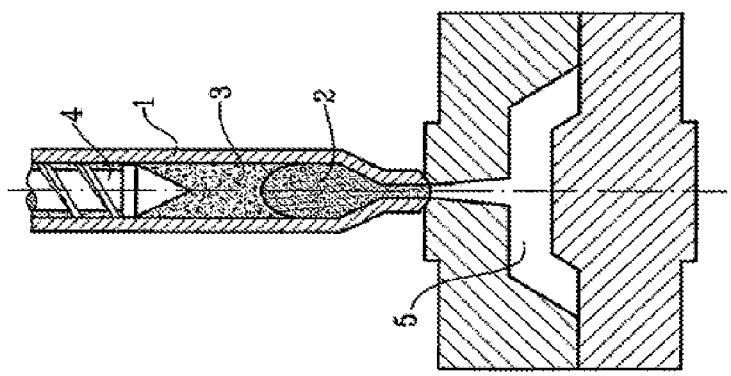
Figure 2:
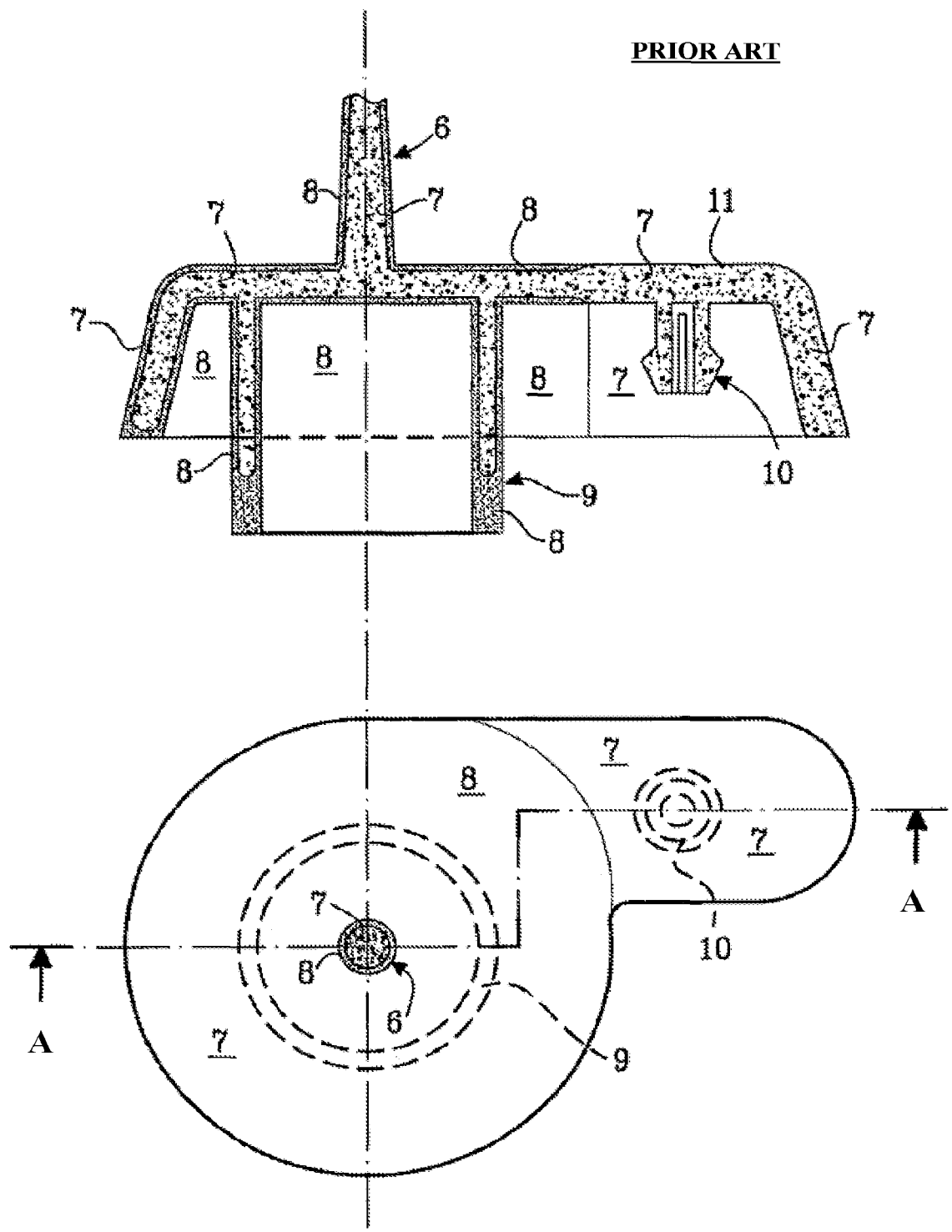
FIGS. 2 & 3 illustrate some of the problems that can occur when injection moulding a part having a complex form using any co-injection method according to the prior art.
Figure 3:
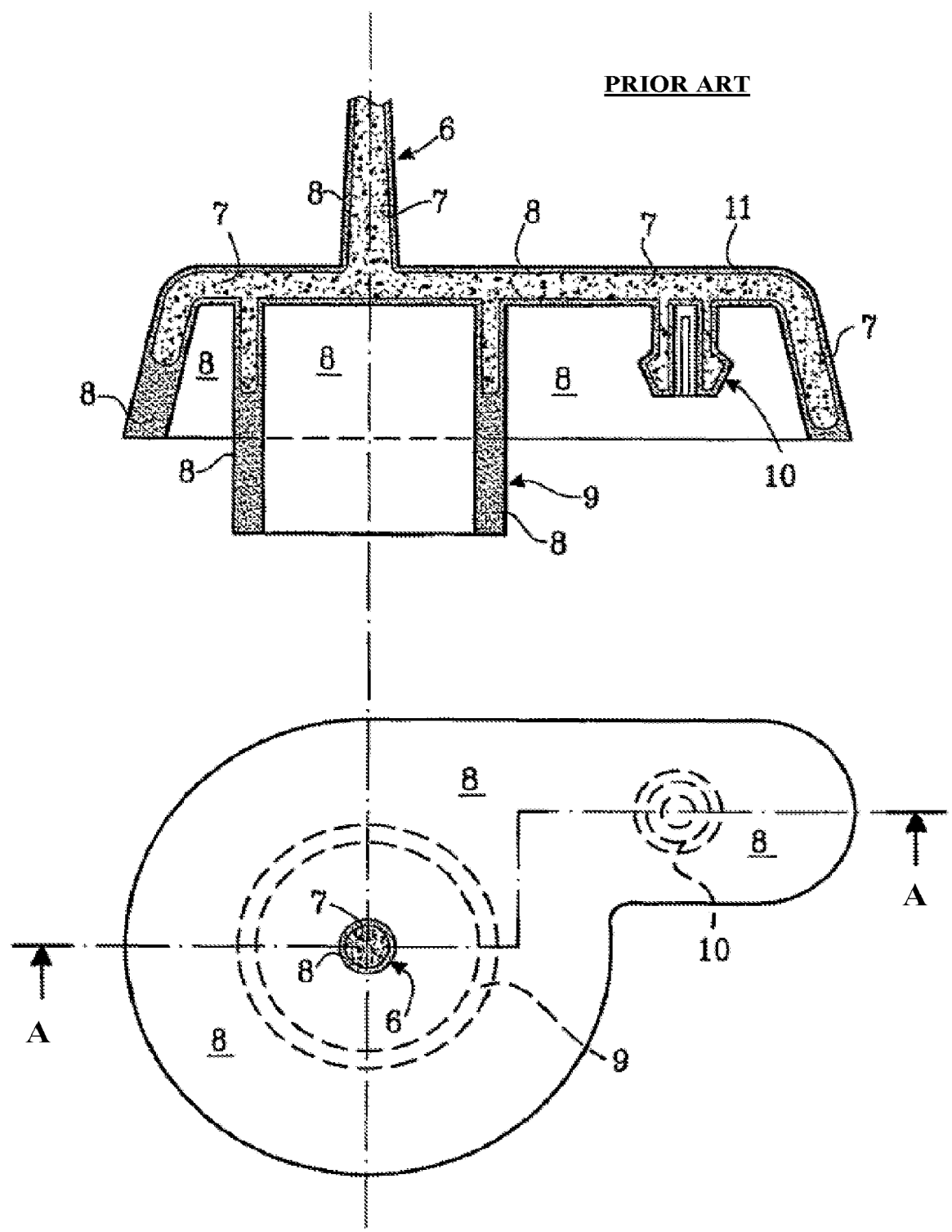
Figure 4:
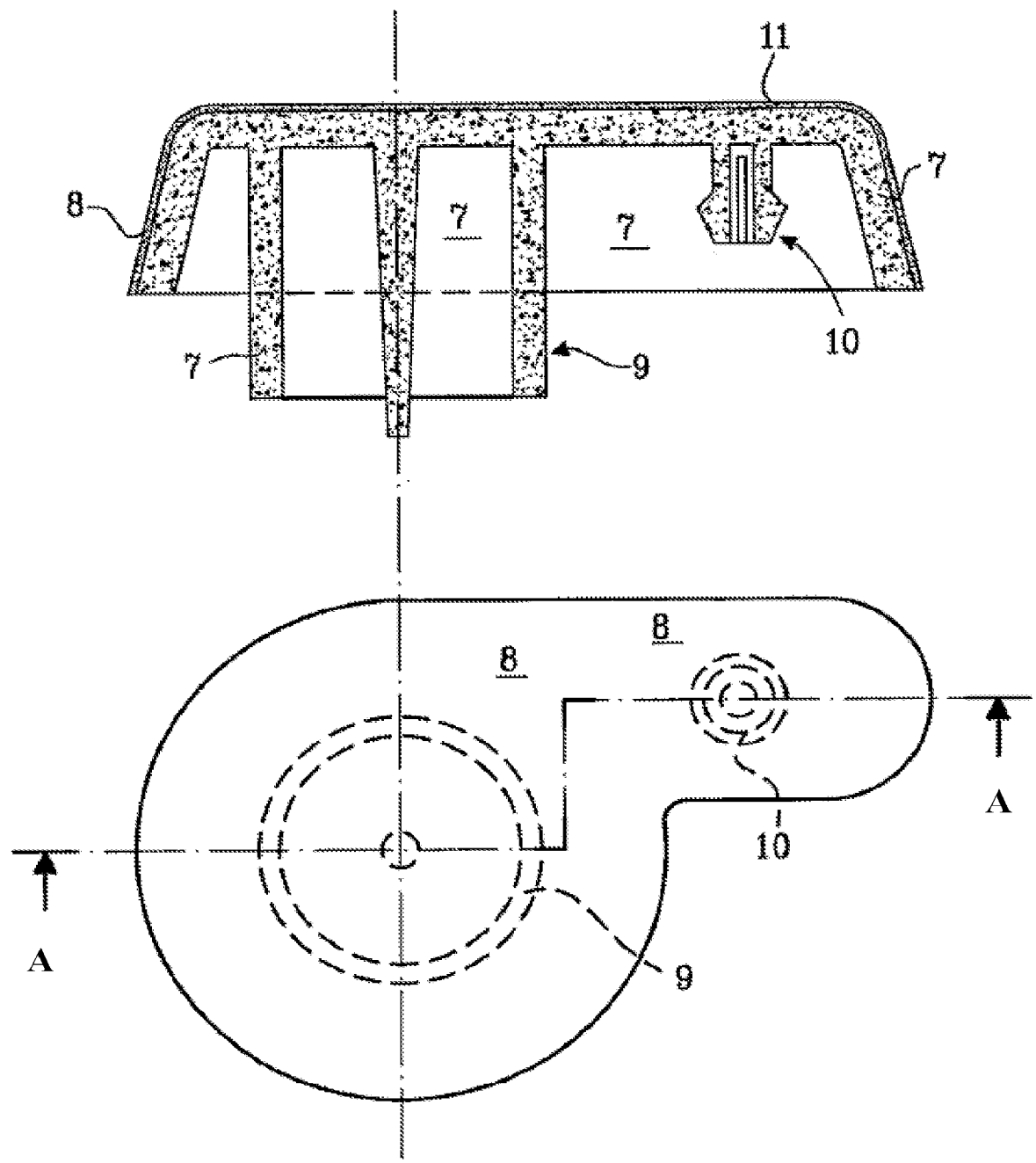
FIG. 4 shows the part illustrated in FIGS. 2 and 3 that has been injection moulded using the over-moulding method according to the prior art.
Figure 5A:
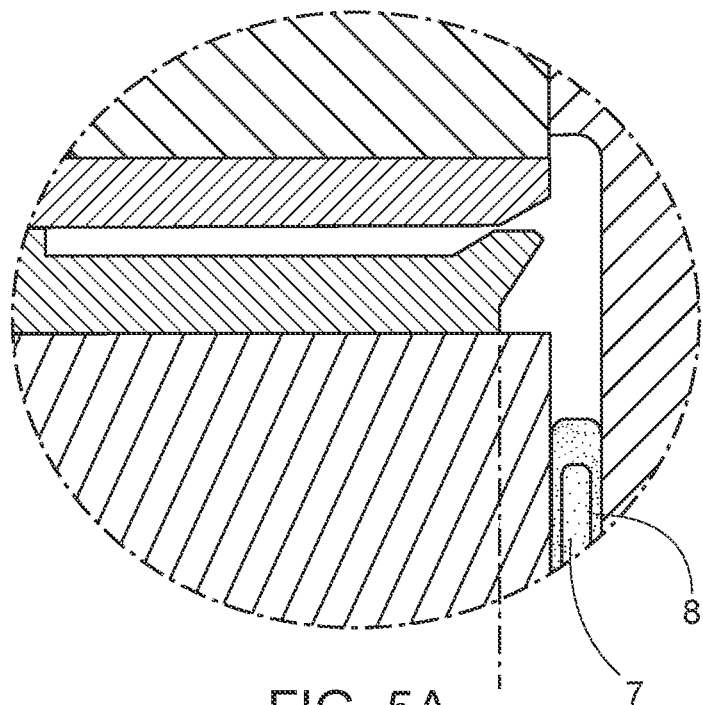
FIGS. 5a-b illustrates a part incorporating an upper portion which is co-injection-moulded and at least one connection integrated therewith which is filled only with core material using a method according to the prior art.
Figure 5B:
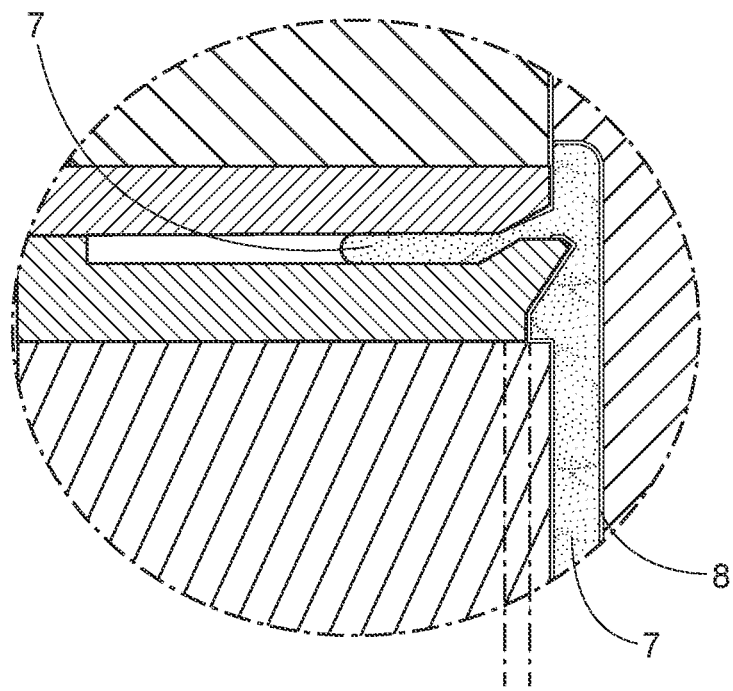
Figure 6:
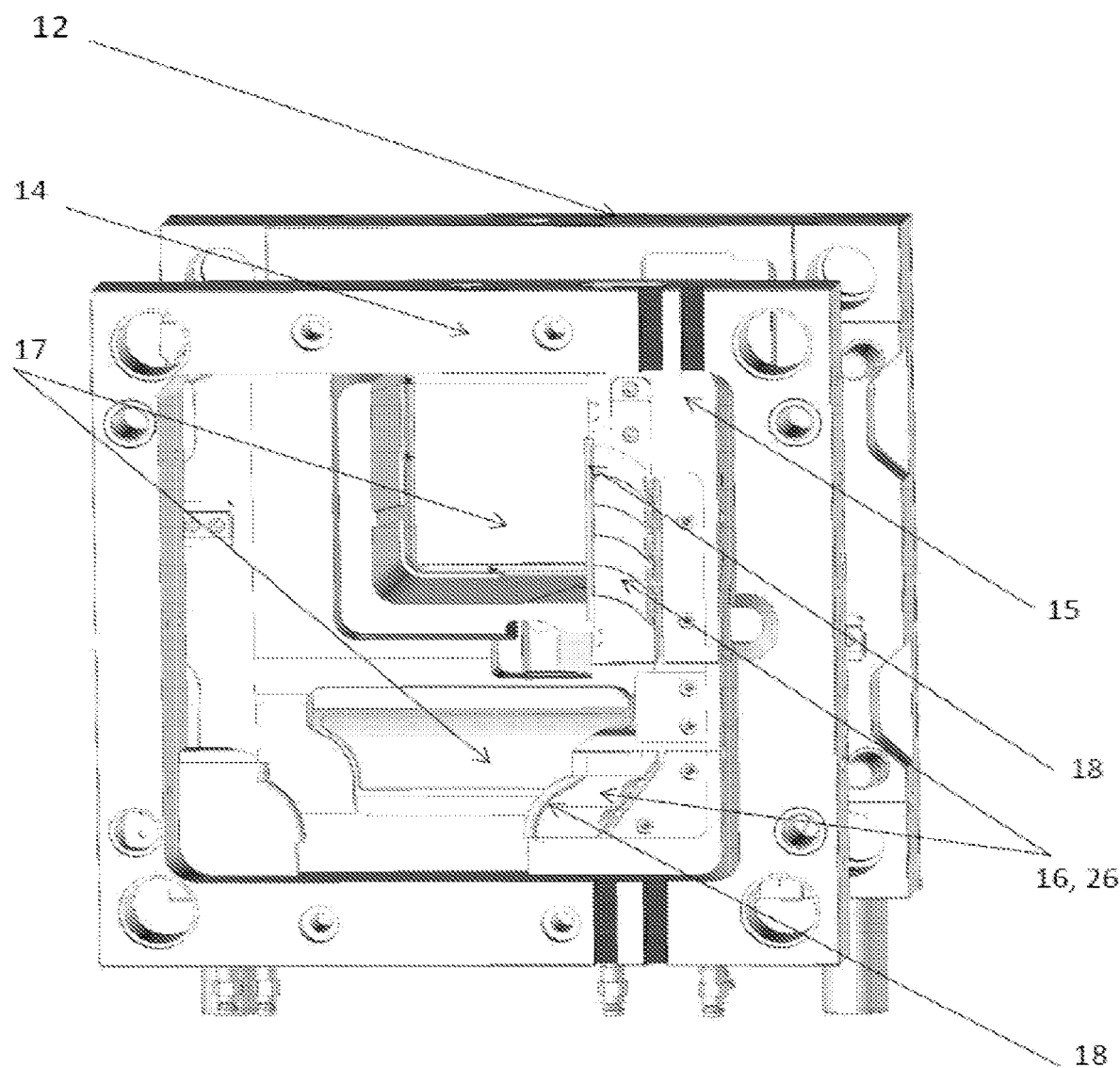
FIGS. 6 & 7 show features of a tool according to an embodiment of the invention.
Figure 7:
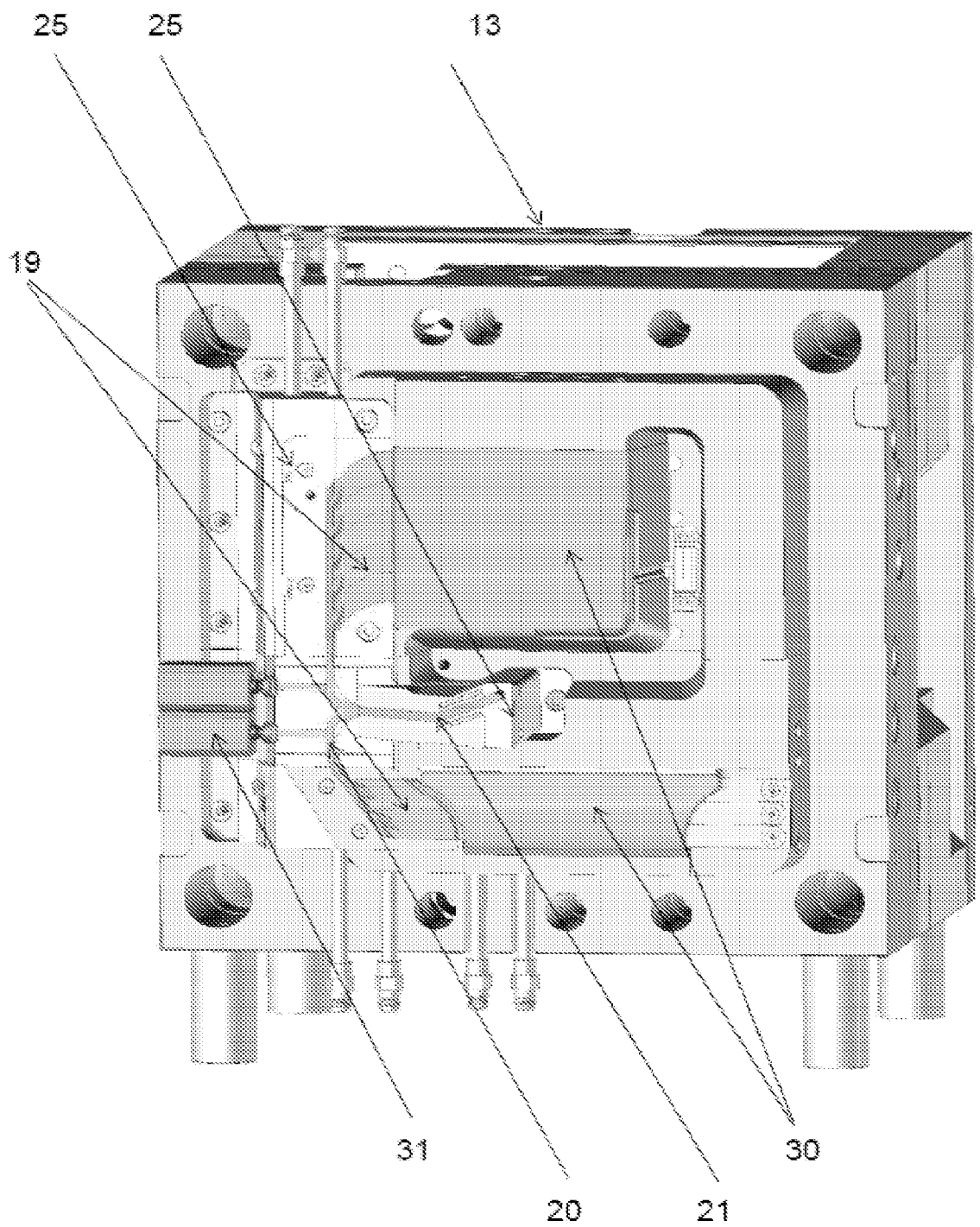

FIGS. 6 and 7 show the two halves of an injection moulding tool, one half 12 on the stationary side and the other half 13 on the moving side of the clamp unit of the injection moulding machine in which the tool is housed, and which tool may be used in a method according to the present invention, such as any co-injection method and the method to mould family parts. The illustrated tool halves 12 and 13 comprise a three-plate mould in which a stripper plate 14 constitutes the third plate. A beam 15 mounted on the stripper plate 14 comprises side gate inserts 16 or 26, and which beam 15 and side gate inserts 16 or 26 are detachable from the stripper plate 14.

The tool halves 12 and 13 comprise two mould cavities 17 in which the parts are to be formed and each mould cavity has a side gate 18. The tool halves 12 and 13 also comprise tool inserts 25 where a plurality of side gate runners 19 and a plurality of two branch runners 20 and a main runner 21 are positioned.

In the illustrated tool halves 12 and 13 of FIGS. 6 and 7, said runners 20 and 21 have rectangular cross sections and are completely positioned in tool inserts 25 mounted on the moving side tool half 13 and the top surface of the moving cores (40 in FIG. 11c) is located at the bottom of the runners 20 and 21, the walls of the through-hole for the moving cores 40 are the side surfaces of said runners and the flat or curved surface of the mould plate 12, opposite inserts 25, in the stationary tool half is located at the top surface of said runners.

Figure 11A:
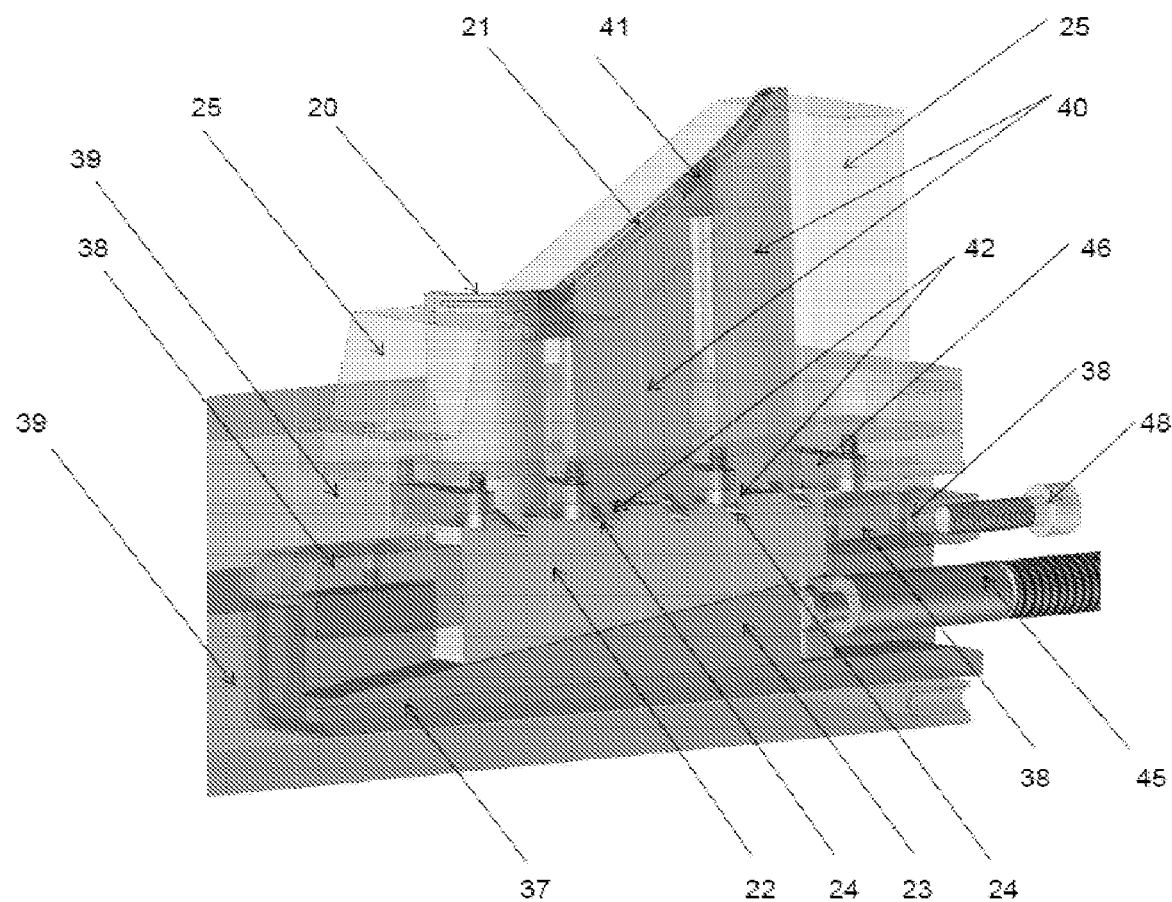
FIGS. 11a-c shows means for changing a cross-sectional dimension and for applying a pressure in the melt in a plurality of runners according to an embodiment of the invention.
Figure 11B:
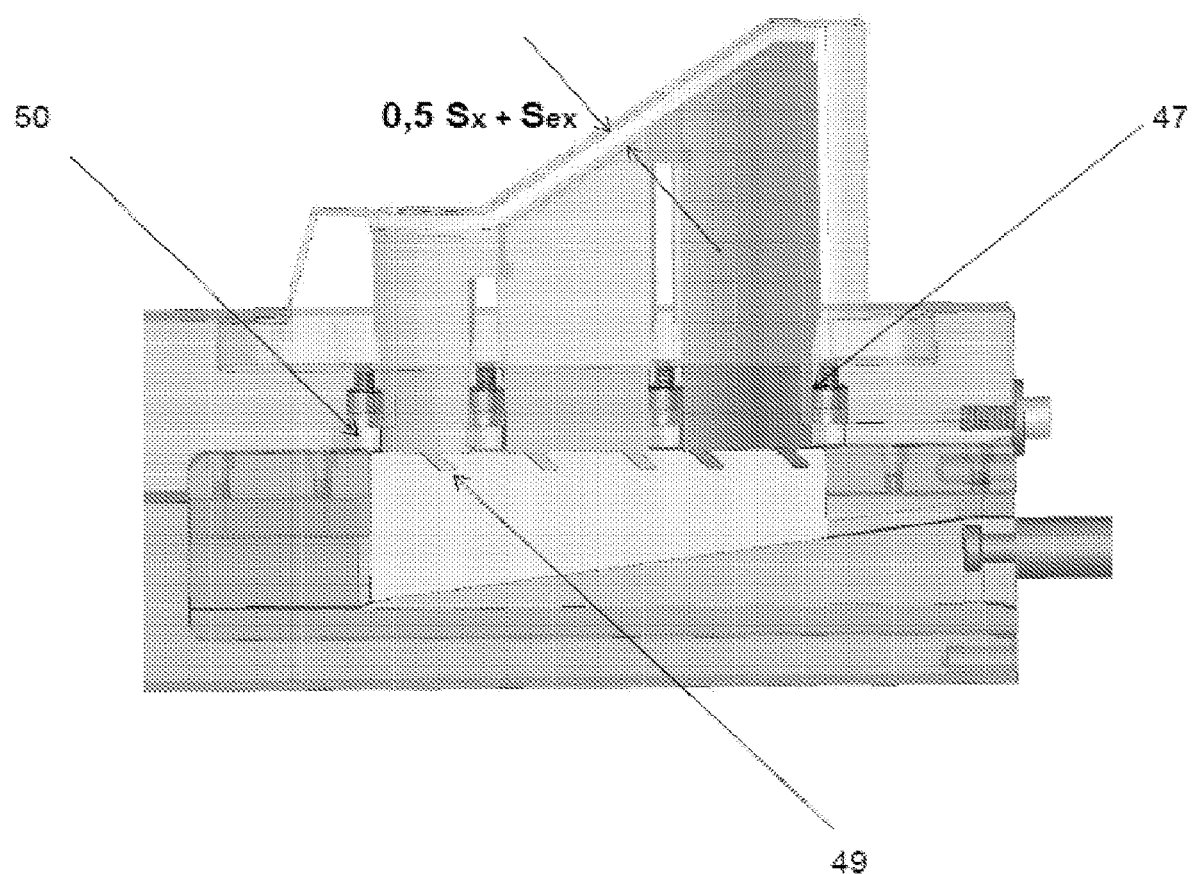
Figure 11C:
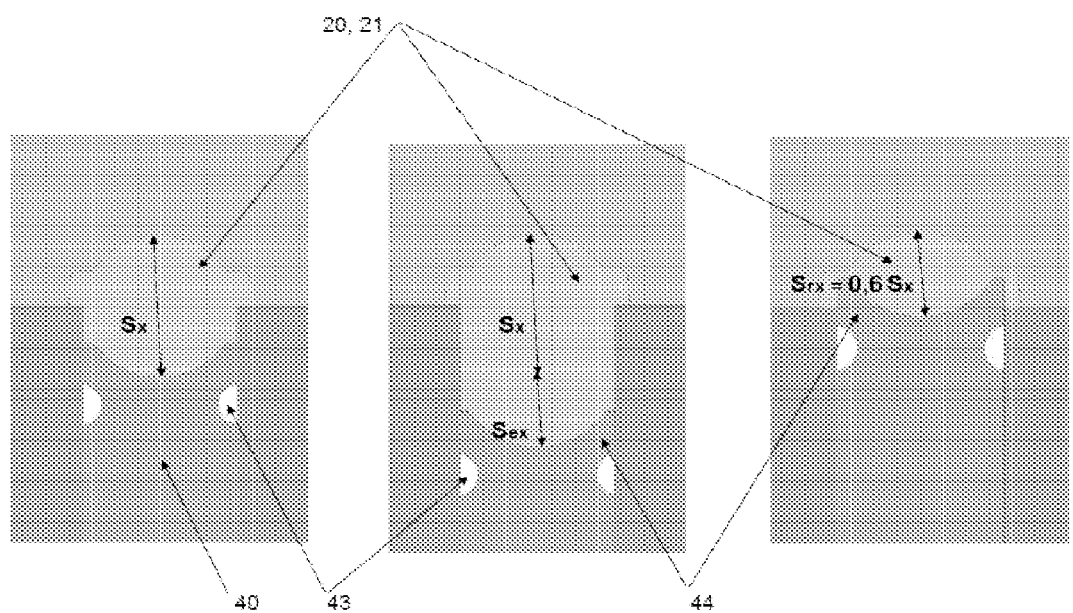
Figure 12:
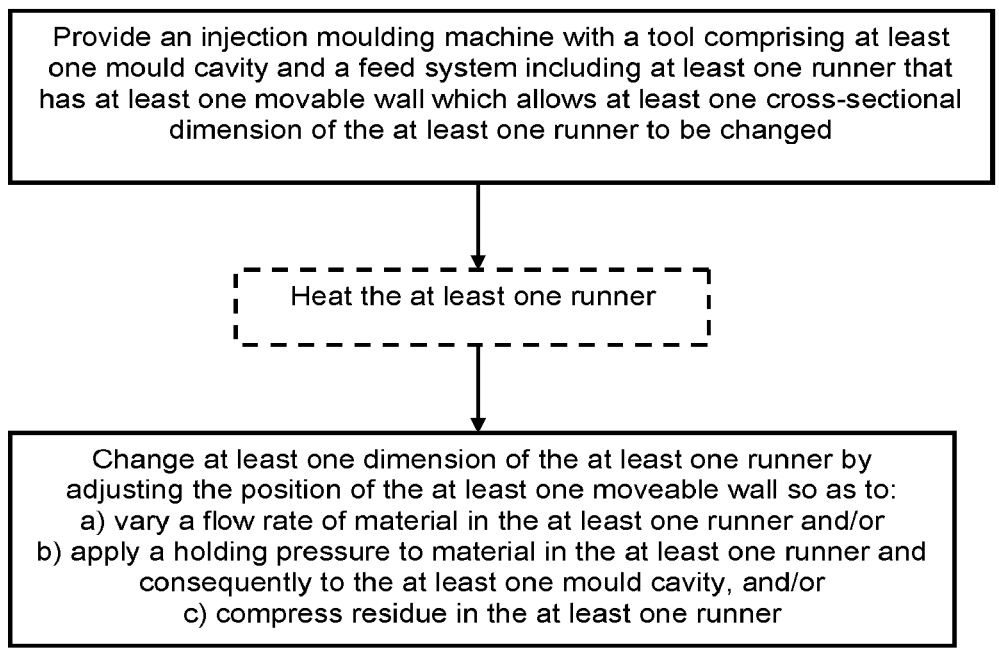
FIG. 12 is a flow diagram showing the steps of a method according to an embodiment of the invention.

FIG. 11c shows that, according to an embodiment of the invention, the plurality of branch runners 20 and main runners 21 may have a substantially circular cross-section, a substantially oval cross-section or any other geometry. By setting the height $S_x$ on the axis of symmetry of the cross-section of the runners 20 or 21 as shown in FIG. 11c the cross-section could, if desired, become substantially oval. Features of said runners 20 or 21 with a substantially circular or an oval cross section are firstly that the plastic residue in the runners 20 and/or 21 will have a smaller volume at the same flow resistance than corresponding runners with rectangular or square cross sections, secondly that the groove 43 together with the radially shaped surface on top of the core 40 forms a flange 44 that will press against the surface of the through-hole for the cores 40, and, especially when a high pressure is built up in the melt or an extreme low-viscosity plastic melt is used, this design of the top of the core will contribute to an improved tightening in order prevent leakage of melt between the core 40 and its through-hole in the tool insert 25.

The tool halves 12 and 13 in the FIGS. 6 and 7 are merely an example of an injection moulding tool which may be used with the method according to the present invention. Generally, a tool does not necessarily have to comprise a stripper plate 14 and a beam 15. Side gate inserts 16 and 26 or cores 40 associated with a plurality of runners 19, 20 and 21, as shown in FIGS. 9, 10a-d and 11a-c, no matter if they are coupled to drive mechanics according to the invention or not, can be positioned directly in the stationary half 12 as well as in the moving half 13 of the tool. A tool according to the present invention may also comprise any number of mould cavities 17, such as one, two, three, four, five, or more mould cavities, where, in the case of a plurality of mould cavities their shapes, sizes and/or volumes may be the same or different..

Figure 8:
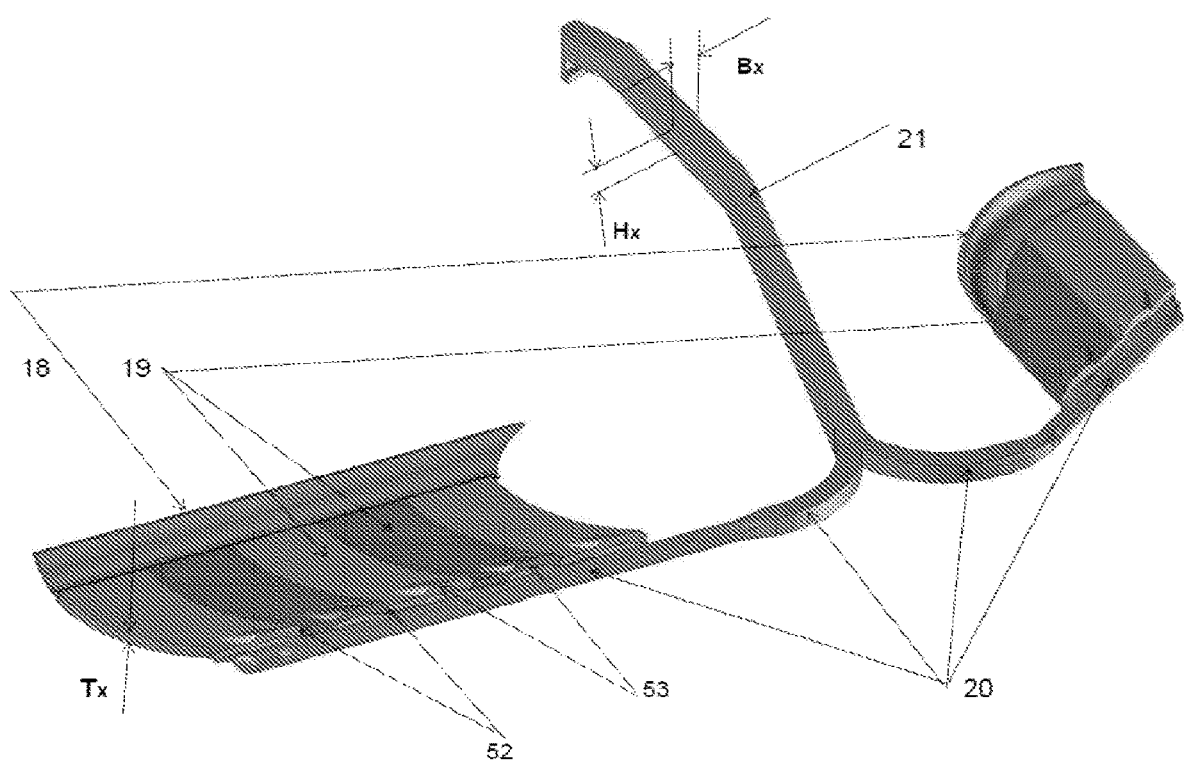
FIG. 8 shows a feed system according to an embodiment of the invention.

FIG. 8 shows features of a feed system according to an embodiment of the invention which is used to feed plastic melt into one or more mould cavities 17 (not shown in FIG. 8) when the injection moulding tool is in use. When the injection moulding tool is in use, there is namely plastic material in the main runner 21, the two branch runners 20 and the plurality of five or two streamlined side gate runners 19. The side gate 18 supplies the melt to the cavities 17. FIG. 8 thus illustrates an exemplary shape and geometry of said side gate 18 and said runners 19, 20 and 21. The feed system is situated in the parting line of the tool in between the moving half 13 and the stationary half 12 and the beam 15. The plastic material in the feed system shown in FIG. 8 has no compressed portions or any other deformations, so the shape/geometry of the plastic material fully corresponds to the surfaces/geometry of the runners and side gate of the feed system in the tool.

The term "gate" means an opening connecting at least one runner to a mould cavity. A side gate is an example of such a gate. A side gate may be located to let in the melt at a lateral edge, or close to such an edge, of either a single-curved or a double-curved wall of the moulded part. A side gate is of course also possible to locate at a straight edge of a flat wall of the part such as the side gate 18 into the larger cavity 17 shown in FIGS. 7 and 8. A gate is dimensioned to allow for sufficient flow of melt to fill a mould cavity without causing too high shear and degradation of the material. Only one gate 18 per mould cavity is preferable to avoid weld lines, when the melt is spreading out in the mould cavity 17, and other defects in the final part. A plurality of runners 19 according to the invention can be arranged to feed melt through a side gate 18. A branch runner 20 with its extension alongside the inlets to the plurality of side gate runners 19, has to be arranged to feed the melt into this plurality of runners 19, whereby means, such as the wedge-like tip 52, to axially split the melt flow front at the inlet of each runner 19, and then deflect the split portion of the melt into each runner of the plurality of runners 19, which deflection can be facilitated by machining a cross section enlargement 53 partly at the inlet of each runner.

The main runner 21 and the two branch runners 20, shown in FIG. 8, both have a rectangular cross section, with heights $H_x$ and widths $B_x$. In corresponding runners with substantially circular or oval cross sections, the diameter is $S_x$ for a circular cross section as shown in FIG. 11c and the width and height for an oval cross section is $S_x$ respective $S_x+\Delta S_x$. The plurality of runners 19 have a thickness $T_x$ in their cross section across the melt flow direction. The index "x" means that the dimensions $H_x$, $B_x$, $S_x$ and $T_x$ belong to more than one of the plurality of runners and thereby may have different, fixed or adjustable sizes. In the illustrated tool, $H_1$, $H_2$ and $H_3$ are the heights of the main runner 21 and of each of the two branch runners 20 respectively, and these heights may have been set by moving the cores 40 either to a fixed position in each runner before the injection moulding operations starts or to be changed gradually or stepless for each cycle during the injection moulding operations. The dimensions $T_x$ for the "thickness" of respective runners in the plurality of runners 19 are $T_1$, $T_2$, $T_3$, $T_4$ and $T_5$ for the large cavity 17 and $T_6$ and $T_7$ for the small cavity 17 and each of the runners 19 may be set at different thicknesses by moving the side gate inserts 16 with the set screws 35, see FIGS. 9 and 10a.

The tool according to an embodiment of the invention is arranged to carry out the one or more of the following functions:
- to infinitely variably adjust the melt flow rate, $cm^3s^{-1}$, to fill either a single mould cavity 17 or to fill each mould cavity of a plurality of mould cavities 17 using individual melt flow rates, and/or
- to apply a holding pressure in the melt in a single mould cavity 17 or individually in each mould cavity of a plurality of mould cavities 17, and/or
- to apply a pressure in the melt to compress the plastic residue in the plurality of runners 19, 20 and 21 of the feed system so that a minimum volume of plastic is left inside the runners 19, 20 and 21.

Figure 9:
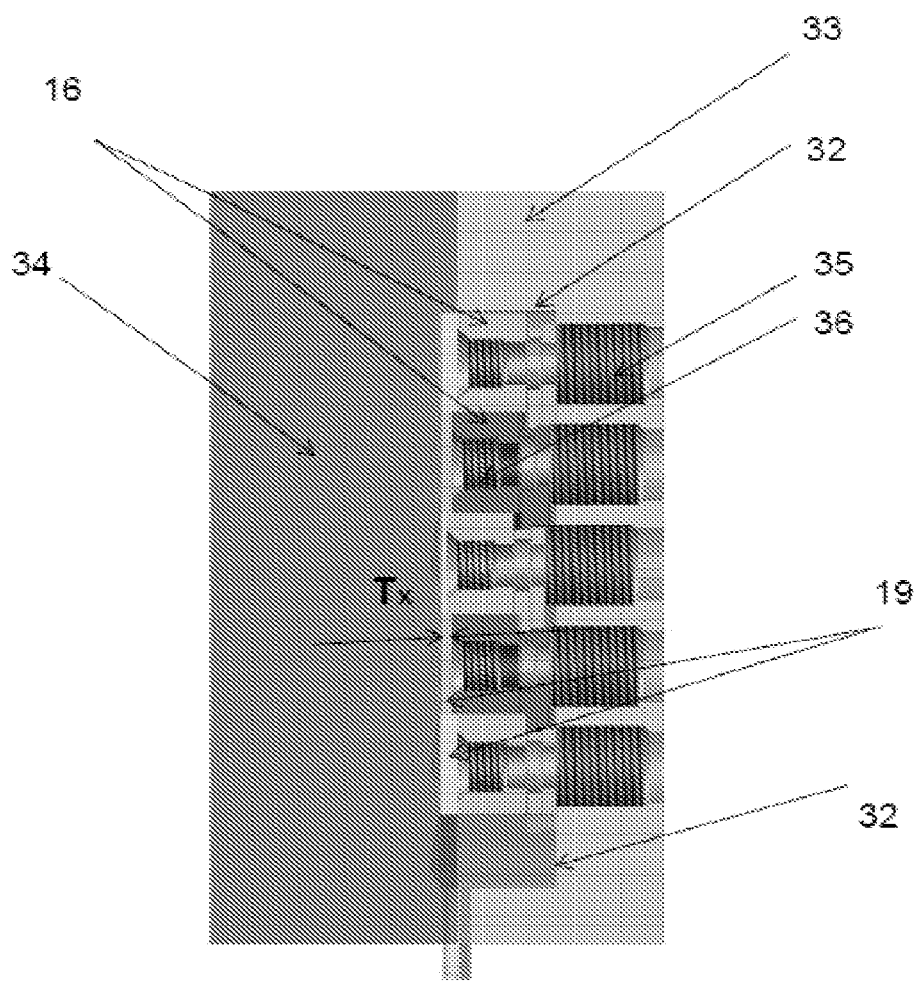
FIG. 9 shows a plurality of runners.
Figure 10A:
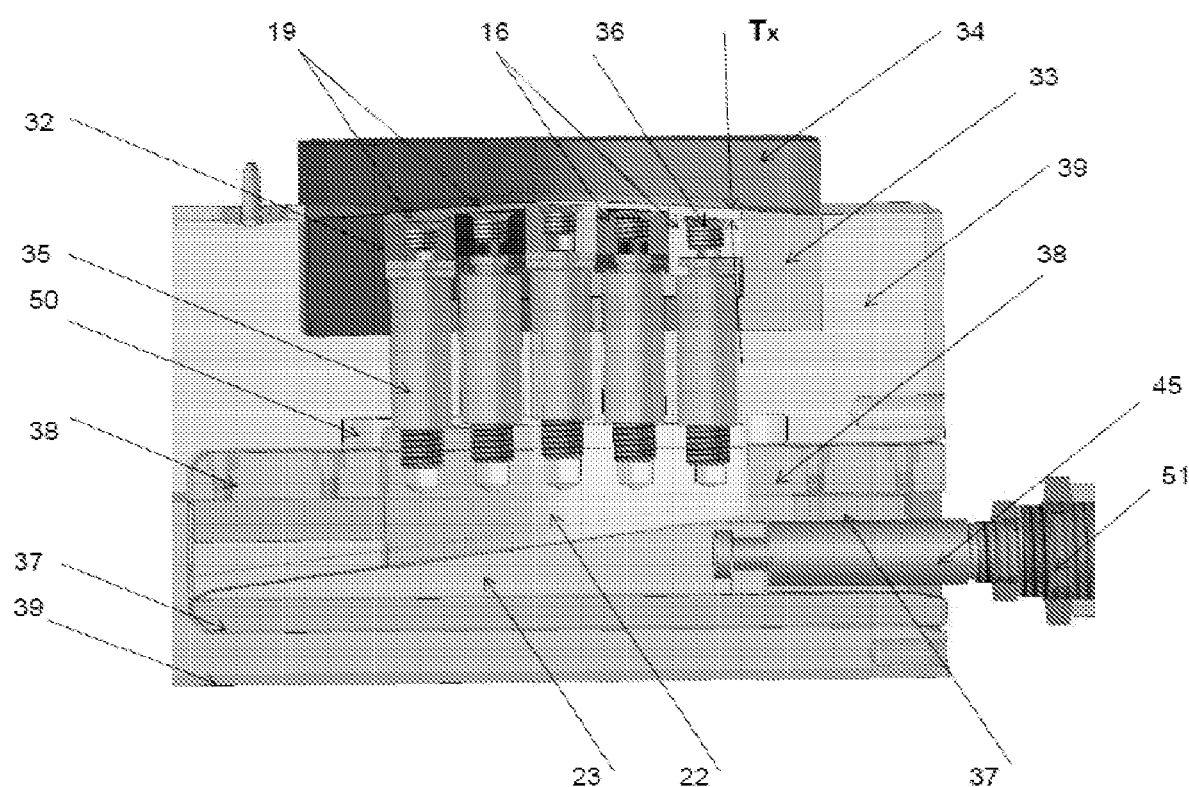
FIGS. 10a-d shows means for changing a cross-sectional dimension and for applying a pressure in the melt in a plurality of runners according to an embodiment of the invention.
Figure 10B:
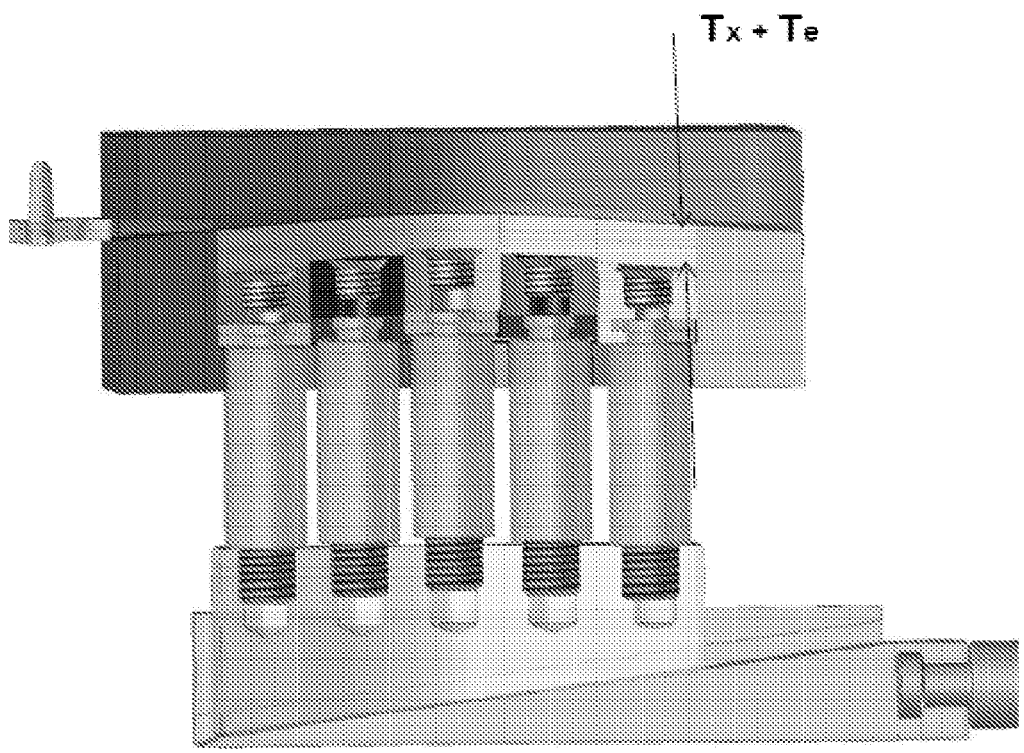
Figure 10C:
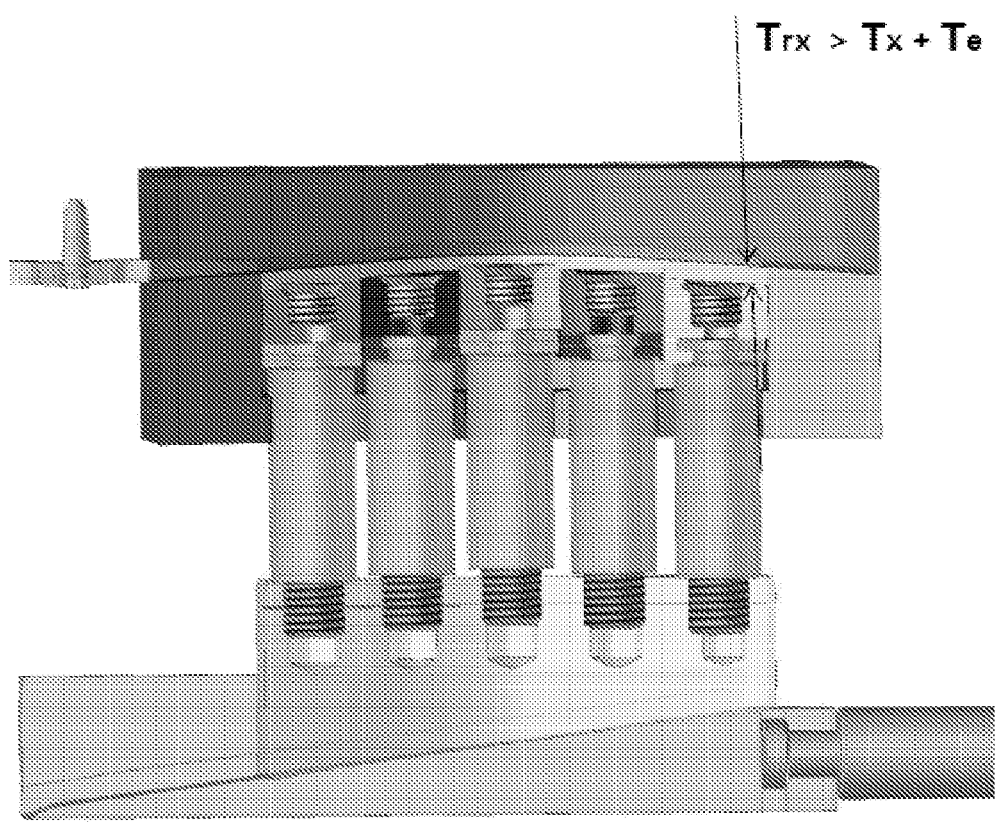
Figure 10D:
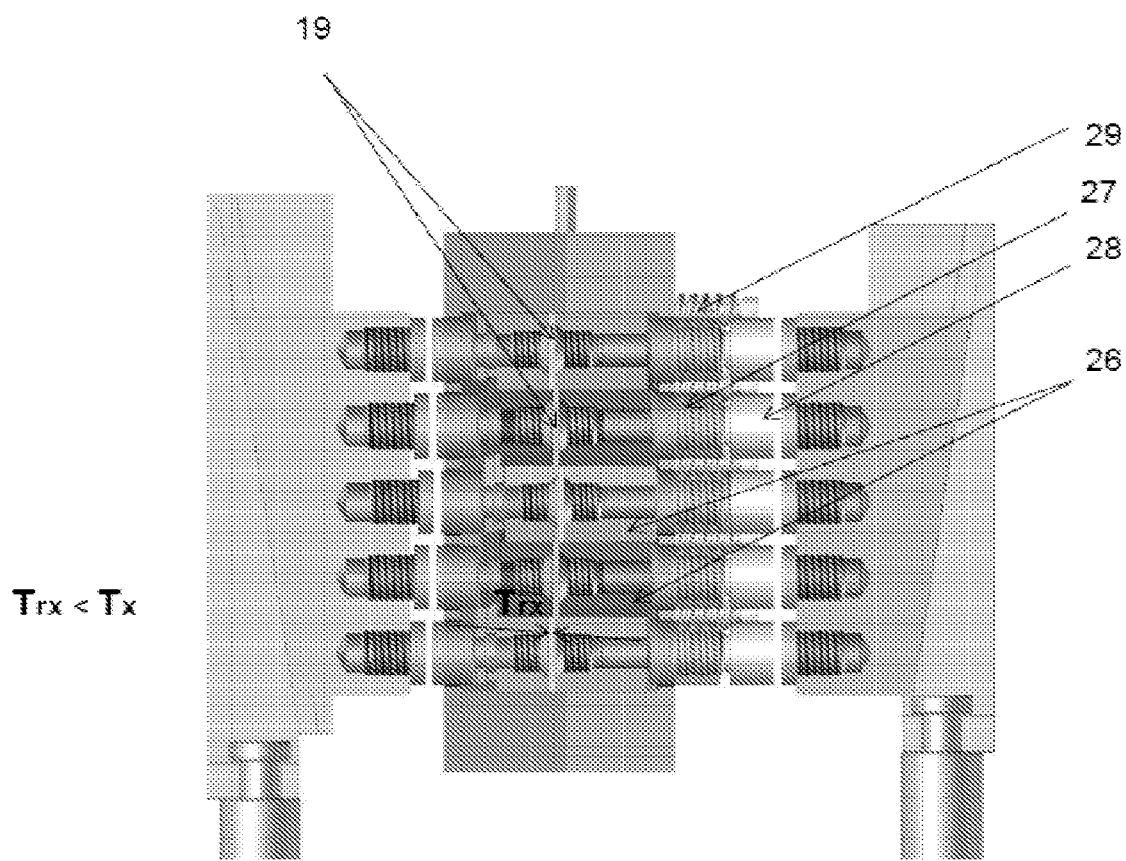

These means are:
- a plurality of side gate runners 19 located upstream of a gate 18, (see FIG. 8 for example), whereby the runners 19 according to the invention are associated with a plurality of infinitely adjustable gate inserts 16 or 26 in one of the tool halves and a fixed gate insert 34 in the other tool half (as shown in FIG. 9), or adjustable gate inserts 26 in the other tool half (as shown in FIG. 10d), which plurality of runners 19 can be coupled to drive mechanics (as shown in FIG. 10a), where one or more of the gate inserts 16 (or inserts 26 in FIG. 10d) are coupled via set screws 35 to an upper wedge 22 and a lower wedge 23 with a connection 45 to a drive unit (not shown).
- a plurality of branch runners 20 and main runners 21 (as shown in FIG. 8), where a moveable wall of each of the runners 20 and 21 is constituted by the top of the cores 40 that are moving in through-holes in the inserts 25 (as is illustrated in the example in FIGS. 11a and 11b), a portion of the surface of the through-holes and a usually single-curved surface in the tool half on the opposite side, and mechanics according to the invention for the plurality of branch runners 20 and/or main runners 21 (see FIGS. 11a and 11b)
- which mechanics for each runner of the plurality of runners 20 and 21 may be either infinitely adjustable to set the cores 40 in an optional fixed position, before the injection moulding operations starts, with a height $H_x$ (as shown in FIG. 8) or $S_x$ (as shown in in FIG. 11c) or $S_x+\Delta S_x$ in an oval cross section, giving a cross section area in each of the plurality of runners 20 and/or 21 so that a desired melt flow rate through each of said runners is obtained, or
- which mechanics for each runner of the plurality of runners 20 and 21 is used for varying the melt flow rate individually in each of said runners during each cycle of the injection operations, or for applying a holding pressure operation in the melt individually in each of said runners, or applying a pressure in the melt to compress the plastic material to a minimum volume individually in said runners corresponding to the heights $H_{rx}$ or $S_{rx}$, or for sequentially combining said melt flow adjusting operations and holding pressure operations during the same moulding cycle. The index "r" means "residue", i.e. the plastic material remaining in the plurality of runners 19, 20 and 21 after the, or each mould cavity has been filled (see FIGS. 10d and 11c).

FIG. 11c illustrates a holding pressure operation where a substantially circular cross section of a runner 20 and/or 21 expands from a height $S_x$ to $S_x+S_{ex}$ in order to accumulate a melt cushion that is necessary for the holding pressure operation. At the end of the holding pressure operation, (see the drawing on the right in FIG. 11c), the melt residue in the runners is compressed to a height $S_{rx}$=about 0,6 $S_x$ provided that the initial cross section is substantially circular with a diameter $S_x$.

The plurality of runners 19 upstream of the gate 18 may be used merely to adjust the melt flow individually in each runner 19 and thereby the profile of the melt flow front can be formed to spread in the cavity(-ies) 17 in such a way that optimum filling is obtained. The dimension $T_x$ is, by successive trials, individually set in each runner of the plurality of runners 19 until the melt flow front in the mould cavity has obtained a desired profile and the entire flow front will reach the farthest contour of the mould cavity at practically the same time. FIG. 9 shows a plurality of gate inserts 16 mounted in a recess 32 of a cassette 33, which inserts 16 together with the fixed insert 34 in the tool half on the opposite side form a plurality of runners where each runner can be adjusted individually by the set screws 35 to a dimension $T_x$ in the plurality of runners 19. The cover screws 36 have to be unscrewed before the set screws 35 can be turned. The cassette 33 and the fixed insert 34 are easy to mount and dismount in the stationary or moving mould plates of the tool.

The embodiment exemplified in FIG. 9 can be used in tools where there is a need of an optimum flow front profile for the spread of melt in the mould cavity, for example at co-injection or conventional single-material injection moulding of parts with complex design, optimum spread of the melt in a mould cavity combined with balancing the melt flow among mould cavities with equal shape, size and volume in a multi-cavity tool.

The embodiment shown in FIG. 9 can be supplemented with drive mechanics to apply a force on the gate inserts 16, (see FIGS. 10a-c) to perform a holding pressure operation in the melt in the plurality of gate runners 19 upstream of the side gate 18 and consequently a holding pressure in the melt that has been fed into the mould cavity 17.

In the embodiment shown in FIG. 10a there is also a cassette 33 with a recess 32 where the side gate inserts 16 are mounted and which together with the fixed insert 34 form a plurality of runners 19 upstream of the side gate 18. The set screws 35 are connected to the upper wedge 22 and the dimension $T_x$ can be adjusted individually by the set screw 35 in each gate insert 16 in the plurality of runners 19 so that the melt flow, when having passed the plurality of runners 19, will form a desired flow front in the mould cavity 17.

FIGS. 10a-c show an example of holding pressure operational steps, where a plurality of side gate inserts 16 are coupled to an upper wedge 22 that via a lower wedge 23 has a connection 24 to a drive unit that may be a double-acting hydraulic cylinder or a hydraulic motor or an electric servo motor. The holding pressure operation is activated to start at the same point of time as the melt filling operation into the mould cavity 17 has ceased, or at a point of time shortly before the filling operation has ceased, meaning that the plurality of side gate runners 19 that has been set to different dimensions $T_x$ (see FIG. 10a) in the next step (shown in FIG. 10b) the package/row of side gate inserts 16 is controlled to expand a distance $T_e$ which distance is the same for all runners in the plurality of runners 19 as the side gate inserts 16 are in fixed positions in relation to each other after being set to dimension $T_x$. The expanding movement $T_e$ is carried out by pulling the lower wedge 23 a corresponding distance backwards in the cassette 33. Thereby plastic melt is accumulated in the plurality of runners 19 to a so-called "melt cushion", which will accomplish a volume, as a result of an appropriately chosen expansion $T_e$, which volume is as large as, or slightly larger than, the volume of plastic melt needed for maintaining a desired holding pressure in the mould cavity 17 during the whole holding pressure operation. The compression of the plastic material terminates with different dimensions $T_{rx}$ (See FIG. 10c) of the plastic residue in the plurality of runners 19 and which dimensions $T_{rx}$ usually are slightly larger than $T_x$.

With this embodiment a holding pressure operation can be performed in the plurality of runners 19, and consequently in the mould cavity 17, provided that there is a device in one of the runners of the plurality of runners 20 or 21 upstream of the plurality of runners 19 for shutting off the melt flow to said mould cavity in order to prevent the melt being pressed backwards whereby a desired holding pressure in the melt that has been supplied to the cavity would not be possible to build up. The shut off device may be positioned in a way that the melt flow can be shut off either in one of the plurality of branch runners 20 or in a main runner 21. FIG. 7 shows two shut off devices 30 that each comprise a mini hydraulic cylinder driving a shut off core that closes and opens the two branch runners 20. Such a shut off device may be designed in different ways.

The embodiment according to the invention that is exemplified in FIGS. 10a-c can be used in tools where there is a need of:

applying an individual holding pressure and an individual time for the holding pressure operation in each of the mould cavities in tools with a plurality of mould cavities 17, for example in a tool for the injection moulding of family parts, applying a holding pressure in a tool comprising a single mould cavity or a plurality of mould cavities with equal shape, size and volume in order to achieve the shortest possible cycle time in cases where a too long time for plasticizing and metering in the injection unit of the injection moulding machine would cause a lengthened cycle time when using the holding pressure function in a conventional injection moulding machine. Injection moulding using the sequential co-injection method Mono Sandwich could be mentioned as such a case where the total time for injection, holding pressure and cooling operations may be so short that the total time for plasticizing and metering of the core layer material and docking of the extruder to the nozzle of the injection unit, followed by metering of the surface layer material will cause a lengthened cycle time. With a cavity-specific holding pressure, the metering of core material can start as soon as the cavity(-ies) has/have been completely (volumetrically) filled as the holding pressure operation in the injection unit of the machine and the corresponding time for said operation is not used.

The embodiment comprising a plurality of side gate runners 19 and cassette 37 which is shown in FIG. 10a, comprising the mechanics to apply a holding pressure in the melt, is possible, even without taking down the tool from the injection moulding machine, by mounting and dismounting the tool in the following way:

Mounting starts with pushing the cassette 37 into the recess in between the mould plates 39 with the wedge 23 in the rear position, (see FIG. 10b) and then connecting the coupling 45 to said wedge. The wedge 23 is then pushed forward until it reaches its end position, (see FIG. 10a) and at the same time the wedge 23 is pushing the wedge 22 within the clearance 50 towards the parting line between the tool halves 12 and 13. After having mounted the cassette 33 in the mould plate 39, set screws 35 together with the side gate inserts 16 or 26 (FIG. 10d) can be screwed through the inserts 16 or 26 from the parting line and tightened into the wedge 22. All dimensions $T_x$ of the plurality of runners 19 are thereby set in their start positions $T_{max}$, such as 3 mm. Finally the cover screws 36 should be screwed into each of the side gate inserts 16 or 26.

Dismounting is carried out in the opposite way starting with unscrewing the cover screws 36 from the side gate inserts 16 or 26.

The embodiment shown in FIGS. 10a-c can be combined with a plurality of side gate inserts 26 including drive mechanics, (see FIG. 10d), which replaces the fixed insert 34 shown in FIGS. 10a-c. The purpose of supplementing said embodiment with a plurality of runners 19 including driven side gate inserts 26 is to compress the plastic material residue in the plurality of runners 19 to a minimum volume, corresponding to a dimension $T_{rx}$, which dimension may be different from side gate runner to side gate runner, in order to get smallest possible amount of residual material when recycling the residue directly into the injection unit of the machine or when recycling the residue separately. The compression operation may be carried out simultaneously from both sides of the plurality of runners 19 (see FIG. 10d). The plurality of side gate inserts 26 and its drive mechanics according to FIG. 10d, is designed just for performing a compression operation on the plastic residue in the plurality of side gate runners 19 and thereby has to be combined either with the embodiment for applying a holding pressure to the melt in said runners 19 according to FIGS. 10a-c or combined with a holding pressure operation in the injection unit of the machine. Usually the dimension $T_x$ could be compressed by at least 50%, i.e. the compressed dimension $T_{rx} \leq 0.5\ T_x$.

The mechanics of the embodiment for the compression operation of the plastic residue in the plurality of runners 19 as shown in FIG. 10d is identical to the mechanics of the embodiment in FIGS. 10a-c for carrying out the holding pressure operation, apart from the side gate inserts 26, the set nuts 27, the screws 28 and the coil springs 29. As the cross sections of the plurality of runners 19 in FIGS. 10a-c have been set to a dimension $T_x$ and the desired dimension of the compressed plastic residue is $T_{rx}$ the set nuts 27 should be turned to move the side gate inserts 26 to be set at a dimension $T_x - T_{rx}$ from their initial position where they are fully tightened to the screws 28 which screws are permanently fully tightened to the wedge 22. The coil springs 29 will ensure that the inserts 26, which are connected to a dowel of the set nuts, are returning together with the set nuts 27 when the drive unit is pulling back the wedges 22 and 23.

An example of the plurality of branched runners 20 and main runners 21 according to the invention, all of them being so-called "cold runners" are shown in FIGS. 7 and 8 in the form of corresponding plastic residues of the feed system. In the tool consisting of the tool halves 12 and 13, FIGS. 6 and 7, said runners have rectangular cross sections and are completely positioned in tool inserts 25 mounted on the moving side tool half 13 where the top surface of the moving cores 40 constitutes the bottom of the runners 20 and 21, the walls of the through-hole for the moving cores 40 are the side surfaces of said runners and the flat or curved surface of the mould plate 12, opposite inserts 25, in the stationary tool half constitutes the top surface of said runners.

The mechanics according to the invention for the plurality of side gate runners 19 is constituted by an upper wedge 22 and a lower wedge 23 connected to a coupling rod 45, which all are mounted in a cassette 37 that is pushed into a recess in between the mould plates 39. The upper wedge 22 is, via the set screws 35, connected to the plurality of side gate inserts 16 or 26, see FIGS. 10a and 10d. The mechanics for the plurality of runners 20 and 21, see FIG. 11a, is also constituted by an upper wedge 22 and a lower wedge 23 connected to a coupling rod 45, which are all mounted in a cassette 37 that is pushed into a recess in between the mould plates 39 and the upper wedge 22 via inclined hooks 42 and notches 24 coupled to the moving cores 40.

FIG. 11a shows the mounting of the moving cores 40 in the through-holes in a tool insert 25. Mounting of the mechanics starts by positioning the cassette 37, wherein the upper and lower wedges 22 and 23 are in a fixed position as shown in FIG. 11a, a short distance backwards from the very front of the recess whereupon the cores 40, including the bridging pieces 41, are pushed into their through-holes so that the hooks 42 will be situated on the upper surface of the wedge 22 a short distance to the left of the notches 24. Then the cassette 37 is pushed said short distance forward to its very front position whereby the hooks 42 will slide down into the notches 24 and thus the cores 40 are thereby connected to the upper wedge 22 as shown in FIG. 11b. Then, in case the operation of the cores so requires, the coupling 45 can connect the lower wedge 23 to a drive unit for the purpose of either adjusting the melt flow rate or applying a holding pressure in the plurality of runners 20 and/or 21 or the coupling 45 can be connected to a screw device (such a device 24 can be seen in FIG. 10a) for setting the heights $H_x$ or $S_x$ or $S_x + \Delta S_x$ in fixed but optional positions in said runners with substantially rectangular or circular or oval cross sections. The cores 40 have a flat surface on both sides of their lower part which surfaces glide against support pieces 47 to ensure that the hooks 42 are fully kept down in the notches 24 during use of the tool. Demounting is carried out in the opposite order, with the upper and lower wedges 22 and 23 in a fixed position (as shown in FIG. 11a), and pulling the cassette 37 a short distance backwards etc. The cores 40 can, when unfastened, be pulled out from their through-holes.

The functions and operations according to the invention, such as start and stop times and speeds/forces for the drive means coupled to the mechanics for the plurality of runners 19, 20 and 21, have to be co-ordinated and controlled in such a manner that this new injection moulding technology can be adapted to specific and different methods that can utilize the invention. Typical operations of the injection moulding machine and the tool according to the invention, are the start of injection and changing injection speed at different positions for the reciprocating motion of the screw piston in the machine, changing the cross section and closing/opening of one or more of the plurality of branch runners 20 or main runners 21, switch-over to holding pressure either in the injection unit of the machine or in the plurality of runners 19, 20 and 21 in the tool and performing the holding pressure and compression operations in one or more of said runners.

The drive means connected via a coupling rod 45 to the mechanics connected to side gate inserts 16 and/or 26 and moving cores 40, which inserts and cores are associated with the plurality of runners 19, 20 and 21, may be hydraulic cylinders. Electric servomotors or hydraulic motors may also be used. The drive means in a tool according to the present invention, may be connected to an electronic control system in such a way that the moulding process in each mould cavity in a tool with a plurality of mould cavities and a plurality of runners, can to a great extent be individually and variably controlled regarding melt flow rate and operations for holding pressure and/or compression of plastic residue in the gating system. The start and end positions for moving the plurality of side gate inserts 16 and 26 and the cores 40 during the injection and holding pressure operations may be set with the screw device 51. The control system may either be stationary and integrated in the injection moulding machine or located externally to the injection moulding machine, i.e. the control equipment may be transportable between different injection moulding machines.

The tool inserts 25, shown in FIGS. 7 and 10, may be designed in such a way that two functions of the new injection moulding technology according to the present invention will be accomplished, which functions are heating the tool inserts 25 to reach a temperature on the walls of the plurality of runners 19, 20 and 21 that might be chosen to be substantially higher than conventionally used mould temperatures recommended by plastic material producers, and said heating of the inserts 25 may be performed so that the least possible amount of heat is conducted or radiated to other parts of the tool such as mould plates, cavity inserts etc, and wear properties of the tool inserts 25 should be sufficient to ensure the lowest possible wear in through-holes for moving cores 40 and in recesses for moving side gate inserts 16 and 26 in the inserts 25 so that the duration of the inserts 25 will be equal to at least the life time of the tool.

Heating of the tool inserts 25 is performed by using a heating unit that is separate from the heating unit that tempers the rest of the tool to achieve and maintain a mould temperature recommended by the plastic producer. The inserts 25 must be thermally insulated to prevent heat from being conducted or radiated to other parts of the tool, which is achieved in several ways such as:

selection of a steel grade with very low heat conductivity such as stainless steel, and designing the inserts 25 with outer and inner recesses whereby the air in the recesses will decrease heat conduction through the material of said inserts.

Moving cores 40 or side gate inserts 16 or 22 perform a reciprocating movement under high pressure and high temperature in the plastic melt at each process cycle and mostly during a long period of time. These process conditions will cause a fairly high pressure between cores 40 and their through-holes and between side gate inserts 16 and/or 26 and their recesses. When injection moulding certain types of plastic material, a mixture of air and volatiles from the melt will to some extent force its way out along the moving surfaces of cores/side gate inserts and/or through-holes/recesses. So there might be both mechanical and corrosive wear on these surfaces. Minor wear could be acceptable on the moving cores 40 and side gate inserts 16 and 22 as they are cheaper to manufacture and easy to exchange in the tool, but said process conditions require that the tool inserts 25 have to be manufactured from an extremely high hardened and corrosion resistant steel grade such as stainless steel hardened to at least 60 HRC. Moving cores 40 and side gate inserts 16 or 22 may be manufactured from a material that is somewhat "softer" but still corrosion resistant. The tool inserts 25 can be manufactured conventionally or using a 3D printing additive method using steel powder.

Further modifications of the invention within the scope of the claims would be apparent to a skilled person.

The invention claimed is:

1. An injection moulding tool for performing a method for simultaneously injection moulding two or more parts with a different size, shape and/or volume using an injection moulding machine, the injection moulding tool including two or more mould cavities and a feed system comprising at least one gate and a plurality of runners that is arranged to be located upstream of said at least one gate, wherein said plurality of runners comprises at least one movable wall that is arranged to enable at least one cross-sectional dimension of said plurality of runners to be changed in order achieve at least one of the following:
a) to apply a holding pressure to material in said plurality of runners and consequently to said two or more mould cavities,
b) to compress residue in said plurality of runners,
whereby said tool comprises means to change said at least one cross-sectional dimension of said a plurality of runners, and whereby said at least one cross-sectional dimension of said plurality of runners is individually variable.

2. The tool according to claim 1, wherein it comprises a plurality of adjacently arranged gate inserts that are adapted to change said at least one cross-sectional dimension of said plurality of runners automatically in a stepless or gradual manner by means of mechanics or hydraulics or an electric circuit including a drive unit and a control system.

3. The tool according to claim 1, wherein it comprises heating means to heat said plurality of runners to a temperature less than a melting point or melting interval of the material in said plurality of runners.

4. The tool according to claim 2, wherein it comprises heating means to heat said plurality of runners to a temperature less than a melting point or melting interval of the material in said plurality of runners.

5. The tool according to claim 1, wherein said movable wall is arranged to be mechanically, hydraulically or electrically controlled by said means to change said at least one cross-sectional dimension of said plurality of runners automatically in a stepless or gradual manner by means of mechanics or hydraulics or an electric circuit including a drive unit and a control system.

6. The tool according to claim 3, wherein said movable wall is arranged to be mechanically, hydraulically or electrically controlled by said means to change said at least one cross-sectional dimension of said plurality of runners automatically in a stepless or gradual manner by means of mechanics or hydraulics or an electric circuit including a drive unit and a control system.

7. The tool according to claim 1, wherein at least part of said means to change said at least one cross-sectional dimension of said plurality of runners constitutes an exchangeable cassette that is arranged to be removably attached to said tool.

8. The tool according to claim 2, wherein at least part of said means to change said at least one cross-sectional dimension of said plurality of runners constitutes an exchangeable cassette that is arranged to be removably attached to said tool.

9. The tool according to claim 3, wherein at least part of said means to change said at least one cross-sectional dimension of said plurality of runners constitutes an exchangeable cassette that is arranged to be removably attached to said tool.

10. The tool according to claim 5, wherein at least part of said means to change said at least one cross-sectional dimension of said plurality of runners constitutes an exchangeable cassette that is arranged to be removably attached to said tool.

* * * * *